United States Patent
Kumar et al.

(10) Patent No.: US 10,303,754 B1
(45) Date of Patent: May 28, 2019

(54) CREATION AND DISPLAY OF DYNAMIC CONTENT COMPONENT

(71) Applicant: Callidus Software Incorporated, Pleasanton, CA (US)

(72) Inventors: Srihari Kumar, Cupertino, CA (US); Shreesha Ramdas, Saratoga, CA (US)

(73) Assignee: Callidus Software, Inc., Dublin, CA (US)

( * ) Notice: Subject to any disclaimer, the term of this patent is extended or adjusted under 35 U.S.C. 154(b) by 381 days.

(21) Appl. No.: 13/906,328

(22) Filed: May 30, 2013

Related U.S. Application Data

(60) Provisional application No. 61/653,003, filed on May 30, 2012.

(51) Int. Cl.
*G06F 17/24* (2006.01)

(52) U.S. Cl.
CPC .................. *G06F 17/24* (2013.01)

(58) Field of Classification Search
CPC ............. G06F 17/24; G06F 17/30867; G06F 17/2247; G06Q 30/0269
See application file for complete search history.

(56) References Cited

U.S. PATENT DOCUMENTS

| | | | |
|---|---|---|---|
| 7,698,270 B2 | 4/2010 | Brave et al. | |
| 7,899,759 B1 | 3/2011 | Heggem | |
| 8,326,964 B1* | 12/2012 | Chourey | G06Q 30/0201 709/223 |
| 2002/0099600 A1* | 7/2002 | Merriman | G06Q 30/02 705/14.52 |
| 2002/0161779 A1 | 10/2002 | Brierley et al. | |
| 2005/0096979 A1* | 5/2005 | Koningstein | G06Q 10/10 705/14.68 |
| 2005/0246231 A1* | 11/2005 | Shkedi | G06Q 30/02 705/14.73 |
| 2006/0010375 A1* | 1/2006 | Salesin | G06F 17/212 715/253 |
| 2006/0282328 A1* | 12/2006 | Gerace et al. | 705/14 |
| 2006/0288000 A1 | 12/2006 | Gupta | |
| 2007/0112630 A1 | 5/2007 | Lau | |
| 2008/0208947 A1 | 8/2008 | Shapira et al. | |

(Continued)

FOREIGN PATENT DOCUMENTS

| | | |
|---|---|---|
| KR | 1020000017873 A | 4/2000 |
| WO | 2007079032 A2 | 7/2007 |

*Primary Examiner* — Howard Cortes

(57) ABSTRACT

In some embodiments, a method includes determining a content type in response to a user accessing a webpage and further based on a user attribute. In some embodiments, the user attribute may be related to a business organization that the user belongs to. In some embodiments, the method may further include determining relevant content to be displayed based on the determined content type, and transmitting webpage data including the relevant content for rendering on a device as a graphical user interface (GUI). In some embodiments, a method comprises of receiving a request to create a dynamic content component and identifying content to be displayed therein. In some embodiments, the method may further comprises customizing a look and feel of the dynamic content component based on the user attributes, and generating a code to display the dynamic content component in response to the user accessing a webpage.

22 Claims, 32 Drawing Sheets

(56) References Cited

U.S. PATENT DOCUMENTS

| | | | |
|---|---|---|---|
| 2008/0313019 A1* | 12/2008 | Jeffers | G06F 17/3089 705/7.34 |
| 2009/0018918 A1 | 1/2009 | Moneypenny et al. | |
| 2009/0089151 A1* | 4/2009 | Protheroe | G06Q 10/00 705/14.69 |
| 2009/0125510 A1 | 5/2009 | Graham et al. | |
| 2009/0132368 A1 | 5/2009 | Cotter et al. | |
| 2009/0148045 A1* | 6/2009 | Lee et al. | 382/190 |
| 2009/0327079 A1* | 12/2009 | Parker | G06Q 30/02 705/14.55 |
| 2010/0088152 A1 | 4/2010 | Bennett | |
| 2010/0114720 A1 | 5/2010 | Jones | |
| 2010/0131339 A1 | 5/2010 | Singh | |
| 2010/0131835 A1 | 5/2010 | Kumar et al. | |
| 2010/0211568 A1 | 8/2010 | Chu | |
| 2010/0262500 A1 | 10/2010 | Yu | |
| 2011/0071911 A1 | 3/2011 | Tung | |
| 2011/0125576 A1 | 5/2011 | Song | |
| 2011/0131485 A1 | 6/2011 | Baa et al. | |
| 2011/0167059 A1* | 7/2011 | Fallah | G06Q 30/08 707/723 |
| 2011/0184813 A1* | 7/2011 | Barnes | G06Q 30/0269 705/14.66 |
| 2011/0191364 A1* | 8/2011 | LeBeau | G06F 17/30672 707/767 |
| 2011/0208575 A1 | 8/2011 | Bansal | |
| 2011/0307481 A1 | 12/2011 | Leite | |
| 2012/0030005 A1 | 2/2012 | Gupta | |
| 2012/0042280 A1* | 2/2012 | Hoffman | G06F 17/30867 715/800 |
| 2012/0124202 A1 | 5/2012 | Cooper | |
| 2012/0166267 A1 | 6/2012 | Beatty et al. | |
| 2012/0221404 A1 | 8/2012 | Ahmed | |
| 2012/0323705 A1 | 12/2012 | Calder | |
| 2013/0132211 A1 | 5/2013 | Tsai | |
| 2013/0268373 A1 | 10/2013 | Grishaver | |
| 2014/0129345 A1 | 5/2014 | Grishaver | |
| 2014/0195345 A1 | 7/2014 | Lyren | |
| 2014/0236716 A1* | 8/2014 | Shapiro | G06Q 50/01 705/14.53 |

\* cited by examiner

*Figure 6*

| Content Type | Relevant Content |
|---|---|
| Human Resources Products | Video Tour of Hiring Cloud |
| Marketing | Marketing White Paper |
| Sales and Commisssions | Webinar and Form Fill on Commissions Products |
| Performance Management | Free Trial of Workflow Software |

| Content Type | User Attributes | Relevant Content |
|---|---|---|
| Human Resources Products | Size: < 50<br>Revenue: < $ 5 million | Information about Hiring Cloud and a Form Fill |
| Human Resources Products | Size: 50-1000<br>Revenue: $ 5-30 million | Video Tour of Hiring Cloud |
| Human Resources Products | Size: > 1000<br>Revenue: > $ 30 million | 60 Day Free Trial of Hiring Cloud |

*Figure 7*

| Content Type | User Intent | Relevant Content |
|---|---|---|
| Human Resources Products | Ready to Buy | 60 Day Free Trial of Hiring Cloud |
| Human Resources Products | Low Intent | Video Tour of Hiring Cloud |
| Human Resources Products | Just Looking for Information | White Paper on Employee Management |

LeadHooks

Operations Editor

Download visitor information via:
- ☐ LinkedIn — 1142
- ☐ Facebook — 1144
- ☒ Form — 1141

Select the form fields you wish to use from the options below: — 1140
- ☐ Name
- ☐ Email ID
- ☐ Company
- ☐ Phone
- ☐ Title Action Button: — 1146
- ☐ Buy Now
- ☐ Download Now
- ☐ Free Trial
- ☐ Read More
- ☐ Register

[Save] — 1145  [Next] — 1147

LeadHooks

Code

```
<script type="text/javascript" src="http://www.leadformix.com/bf/RenderLeadHook.php?siteid=7391_basic"></script>
<script type="text/javascript" src="http://www.leadformix.com/bf/leadhook/basic/basic.js"></script>
```

1172

1174 Copy Code

CREATION AND DISPLAY OF DYNAMIC CONTENT COMPONENT

RELATED APPLICATIONS

This application claims the benefit of and priority of U.S. provisional patent application No. 61/653,003, filed on May 30, 2012, by Kumar et al., the disclosure of which is incorporated herein in its entirety and for all purposes.

BACKGROUND

Lead generation contributes to the survival and profitability of a business-to-business (B2B) company. Typically, a B2B company may receive leads based on the initiative of a visitor of its website. For example, the visitor may navigate to the B2B company's "Contact Us" webpage to fill out a form to request more information about a product or service, which results in the generation of a lead. As such, the B2B company, typically, relies on the visitor's initiative to generate a lead.

SUMMARY

Accordingly, there is a need to improve sales lead generation for companies, particularly their business to business aspect. Sales lead generation is improved by identifying products and services that may be of an interest/need of each visitor. Products and services of interest may be identified for each visitor based on the visitor's attributes, therefore unique to each visitor. It will become apparent to those skilled in the art in view of the detailed description that the embodiments of the present invention remedy the above-mentioned needs and provide the above referenced advantages.

According to some embodiments, a dynamic content component is used to display relevant information to a visitor of a webpage. In some embodiments, a dynamic content component may be a graphical user interface (GUI) within a webpage that displays content about products and services offered by the company. It is appreciated that the content about the products and services may be based on visitor's attributes, e.g., a business organization that the visitor belongs to, revenue of the business organization that the visitor belongs to, title of the visitor within the business organization, etc. In other words, the dynamic content component is configurable, dynamic, and customizable to display relevant content to the visitor based on the visitor's unique attributes.

Accordingly, different visitors of the same webpage may be presented with different products/services based on the visitor's attributes. Therefore, the dynamic content component may be used as a "hook" to entice and encourage the visitor to inquire further about the offerings provided by a company since the dynamic content component displays content about products and services based on the visitor's needs and interests, thereby improving lead generation.

In some embodiments, a method comprises of determining a content type in response to a user accessing a webpage and further based on a user attribute. In some embodiments, the user attribute may be related to a business organization that the user belongs to. In some embodiments, the method further comprises determining relevant content to be displayed based on the determined content type, and transmitting webpage data including the relevant content for rendering on a device as a graphical user interface (GUI).

In some embodiments, the content type may be related to an intent of the user accessing the webpage. In some embodiments, the user attribute may be an attribute selected from a group consisting of location of the user, web browsing history of the user, revenue of a business organization, a size of the business organization, location of the business organization, user selection of information related to a hyperlink on the webpage, and social networking information associated with the user. In some embodiments, the relevant content may be selected from a group consisting of service information related to the business organization, a product related to the business organization, an event related to the business organization, a news article related to the business organization, a person related to the business organization, a group related to the business organization, and an industry sector related to the business organization. In some embodiments, the method may further comprise determining user information in response to a selection of a GUI component in the webpage, and storing the user information as information of a prospective customer.

In some embodiments, GUI operable to be rendered on a display device comprises a first window configured to display a first content associated with a first webpage and a dynamic content component displayed within the first webpage. In some embodiments, the dynamic content component may be configured to display a second content. In some embodiment, the second content may be different from the first content. In some embodiments, the second content may be based on a user attribute related to a business organization that a user belongs to. In some embodiment, the dynamic content component has a first size and may be configured to display a portion of the second content, and the dynamic content component may change sizes from the first size to a second size and displays more detail related to the second content in comparison to the portion of the second content. In some embodiments, the change in size may be in response to a user selection of the dynamic content component.

In some embodiments, the dynamic content component may be positioned near an edge of the first window. In some embodiments, a portion of the dynamic content component may remain near the edge of the first window when the dynamic content component changes size from the first size to the second size.

In some embodiments, the dynamic content component may be configured to be displayed in a second webpage in response to a user accessing the second webpage. In some embodiments, the second webpage is associated with a third content that is different from the first and second contents. In some embodiments, the dynamic content component maintains displaying the second content for a period of time.

In some embodiments, the dynamic content component may include a user fillable form to receive user information. In some embodiments, the received user information may be stored as a prospective customer. In some embodiments, the dynamic content component may be configured to display a second window with additional information related to the second content. In some embodiments, the dynamic content component may be configured to cause an upload or download data in response to a user selection thereof. In some embodiments, the dynamic content component may be configured to render non-text information in response to a user selection thereof.

In some embodiments, a method comprises of receiving a request to create a dynamic content component and identifying content to be displayed in the dynamic content component. In some embodiments, the content may be based on user attributes. In some embodiments, the method may further comprises customizing a look and feel of the dynamic content component based on the user attributes, and generating a code to display the dynamic content component in response to the user accessing a webpage. In some embodiments, the identified content is rendered in the customized look and feel of the dynamic content component.

In some embodiments, the method may further comprise receiving a time period to display the dynamic content component in the webpage. In some embodiments, the method may further comprise performing an operation in response to a user selection of the dynamic content component. In some embodiments, the operation may be selected from the group consisting of downloading data, initiating a financial transaction, and displaying additional information related to the identified content.

In some embodiments, the method may further comprise generating a graphical representation of the dynamic content component to include in the webpage. In some embodiments, the graphical representation may include a color, a shape, an image and a position of the dynamic content component in the webpage. In some embodiments, the method may further comprise generating a preview of the dynamic content component prior to generating the code. In some embodiments, the method may further comprise determining user information based on the user accessing the webpage, and storing the user information as a potential customer in response to the user selecting the dynamic content component.

In some embodiments, the code may be configured to render the dynamic content component in a first sized window to display a portion of the identified content. In some embodiments, the code may be configured to change the window size of the dynamic content component from the first size to a second size to display more detail related to the identified content in comparison to the portion of the identified content, wherein the change in size is in response to a user selection of the dynamic content component. In some embodiments, the code may be configured to position the dynamic content component near an edge of the webpage. In some embodiments, the code may be configured to display a portion of the dynamic content component and maintain the window near the edge of the webpage when the window of the dynamic content component changes size from the first size to the second size.

In some embodiments, a GUI operable to create a dynamic content component comprises a plurality of GUI components configured to receive a selection of content, receive a selection of look and feel parameters to customize the dynamic content component, receive user attributes, and generate a code based on the selection of content, the selection of look and feel parameters, and further based on the user attributes. In some embodiments, the code is operable to display the selection of content in the customized dynamic content component. In some embodiments, the display of the selection of content in the customized dynamic content component may be in response to a user accessing the webpage and further in response to attributes the user accessing the webpage matching the received user attributes.

In some embodiments, the plurality of GUI components may be configured to receive a selection of a time period to display the dynamic content component in the webpage. In some embodiments, the look and feel may include a color, a shape, an image and a position of the dynamic content component in the webpage. In some embodiments, the plurality of GUI components may be configured to include a user fillable form in the dynamic content component in response to a selection thereof. In some embodiments, the plurality of GUI components may be configured to include GUI button in the dynamic content component for performing an operation in response to a selection thereof. In some embodiments, the GUI button may be selected from the group consisting of: a GUI button configured to cause a download of data, a GUI button configured to initiate a financial transaction, and a GUI button configured to display additional information related to the selection of content. In some embodiments, the GUI may further comprise a window configured to display a preview of the selection of content in the customized dynamic content component.

BRIEF DESCRIPTION OF DRAWINGS

Various embodiments are illustrated by way of example, and not by way of limitation, in the figures of the accompanying drawings and in which like reference numerals refer to similar elements.

FIG. 6 shows an exemplary table for determining relevant content for a dynamic content component according to one embodiment.

FIG. 7 shows an exemplary table for determining relevant content for a dynamic content component based on user's attributes according to one embodiment.

FIG. 8 shows an exemplary table for determining relevant content of a dynamic content component based on a user's intent according to one embodiment.

FIGS. 11A-11J show exemplary GUIs used to create a dynamic content component according to one embodiment.

DETAILED DESCRIPTION

Figure 1A:
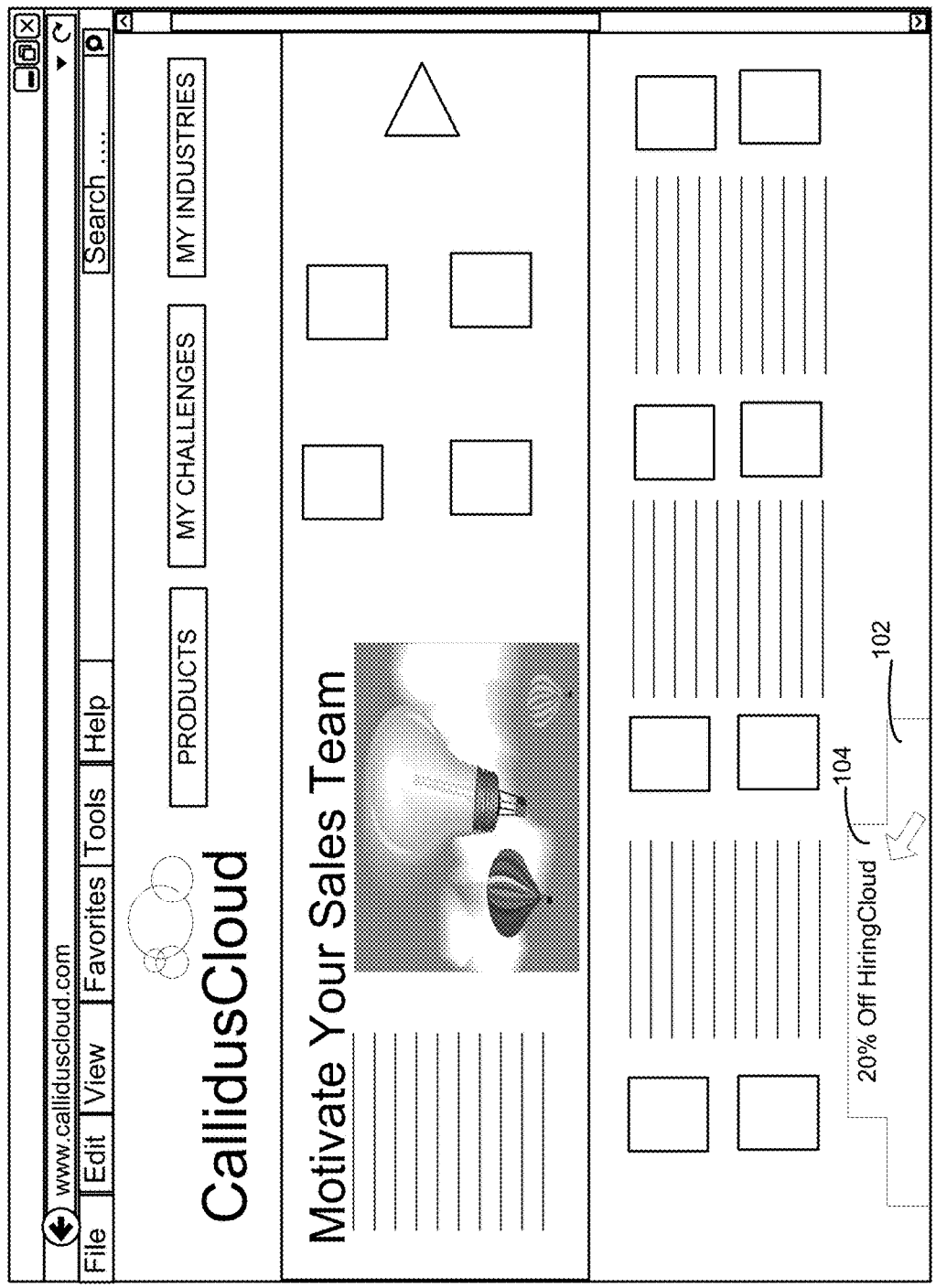
FIGS. 1A-1F show a webpage example with a dynamic content component with different content types according to one embodiment.

Reference will now be made in detail to various embodiments, examples of which are illustrated in the accompanying drawings. Various embodiments described are exemplary and for illustration purposes. As such, it will be understood that these various embodiments are examples and not intended to limit the invention. On the contrary, the embodiments are intended to cover alternatives, modifications, and equivalents, which may be included within the scope of the invention as construed according to the appended Claims. Furthermore, in the following detailed description of various embodiments, numerous specific details are set forth in order to provide a thorough understanding of the invention. However, it will be evident to one of ordinary skill in the art that the invention may be practiced without these specific details. In other instances, well known methods, procedures, and components have not been described in detail as not to unnecessarily obscure aspects of the invention.

Some portions of the detailed descriptions that follow are presented in terms of procedures, methods, flows, logic blocks, processing, and other symbolic representations of operations performed on a computing device or a server. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device or a processor. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Lead generation is important to increase sale and profitability of a B2B company. Unfortunately, conventional lead generation techniques require the visitor of the website to navigate through various webpages to obtain relevant information, e.g., product/service offering, whitepapers, publications, etc. Moreover, visitors are often required to fill out a form to obtain additional information. This process is not only time consuming but burdensome for potential customers, adversely impacting sales and profitability.

Other conventional systems may provide tailored content to website visitors based on user's web browsing history alone. Relying solely on user's web browsing history while may be effective for business to customer targeting, it may not be as effective in a B2B setting. For example, a user may be a networking engineer and while at home may be browsing for teapots. Offering content related to teapots is not relevant to the networking engineer at work and does not generate a lead or sale. Accordingly, there is a need to improve lead generation and sale for a B2B company to market product and services to its visitors in a B2B setting.

In some embodiments, a dynamic content component is used to overcome these issues and to improve leads generation and ultimately sales. A dynamic content component functions as "hook" or "bait" to lure visitors in obtaining further information about a product or service offered by a B2B company in a user friendly fashion. In some embodiments, a dynamic content component is a graphical user interface (GUI) component displayed in a webpage that dynamically changes to display relevant content based on a determined visitor's interest/intent. In some embodiments, the content corresponding to a visitor's interest may be based on the visitor's attributes, such as a business sector that the visitor is associated with, an amount of revenue generated by a business organization that the visitor belongs to, a size of the business organization that the visitor belongs to, the visitor's title in the business organization that he belongs to, the department that the visitor belongs to within the business organization, the visitor's web browsing history, the visitor's social networking information, and other attributes. In other words, dynamic content component displayed for individuals from different organizations viewing the same webpage are different because of their respective visitor's attributes. Moreover, dynamic content component displayed for individuals in the same sector from different organization viewing the same webpage may be different because of their respective visitor's attribute, e.g., organization size, title of the visitor, etc. Furthermore, it is appreciated that the use of a dynamic content component enables the content to be customized to each individual even if the individuals are from the same organization.

In an illustrative example, Annie, a Finance and Sales Operation manager at an insurance company called Acme Co., may be viewing CallidusCloud's® main webpage. The CallidusCloud® main webpage may display general content about the company and further include a dynamic content component, such as a GUI window, that displays content relevant to Annie's interest and/or Annie's intent for accessing the main webpage. In this example, Annie's interest may include offerings related to sale representative compensation plans. It is appreciated that Annie's interest may be determined based on various information gathered about Annie, such as her title as a "Finance and Sales Operation manager," organization at which Annie works for, e.g., the insurance sector, geographical location that her organization is based out of, etc. In some examples, Annie's interest may be further determined based on Annie's search history for compensation plans.

Based on this information, the dynamic content component displays content about CallidusCloud's® compensation plans software products. In this example, the dynamic content component may display a video tour of CallidusCloud's® compensation plan software product and a form to receive additional information about Annie and Acme Co. to provide additional information about products/services of interest. Once Annie fills out the form, Annie can view the video tour and her information may be stored as a potential sales lead. Although in this example the video tour is rendered after Annie fills out a form, in other embodiments, the video tour may be rendered automatically and without filling out a form.

In contrast, when Bubba, a Human Resource representative at Acme Co., views CallidusCloud's® website, the dynamic content component displays information that is relevant to Bubba's interest and/or intent. In this example, Bubba's interest may include offerings related to Human Resources. As such the dynamic content component may display an offer for a "30 day Free Trial" of a human resources software.

As the examples illustrate, the dynamic content component may be configured to be dynamic and customizable to display content relevant to each visitor, thereby improving leads generation and in particular qualified sales leads. Furthermore, as the examples illustrate, the dynamic content component is a powerful tool to provide information that is relevant and customized to each visitor in a user friendly fashion, thereby improving leads generation.

Referring now to FIGS. 1A-1F, FIGS. 1A-1F show a webpage example with a dynamic content component with different content types according to one embodiment. FIGS. 1A-1F will be described with references to users accessing a webpage 100 to further highlight and illustrate various embodiments.

FIG. 1A shows a webpage 100 that may be displayed on a display of a device, such as a computer, a laptop, a mobile device, etc. In FIG. 1A, a dynamic content component 102 is displayed in the webpage 100. The dynamic content component 102 may be a partially hidden tabbed folder positioned near the lower left hand corner of CallidusCloud® main webpage 100, in one instance as shown. When Danny, a human resources representative at BioPharma, accesses webpage 100, Danny's interest/intent may be determined. As such, content may be customized and tailored based on the determined interest for rendering in the dynamic content component 102. In this example, Danny's internet protocol (IP) address may be used to determine Danny's interest. Using the IP address, computing devices and servers may perform a database query to determine information about the source of the IP address. In this example, it is determined that webpage 100 was accessed by a human resource representative at BioPharma. Based on this information, it may be determined that Danny may be interested in human resources offerings. Accordingly, content related to human resource products/services from CallidusCloud® may be displayed.

In some embodiments, Danny's interest may be determined based on his attributes, such as Danny's geographic location, Danny's web browsing history, BioPharma's revenue, size of BioPharma, BioPharma's products/services, BioPharma's geographical location(s), Danny's department at BioPharma, Danny's title at BioPharma, hyperlink phrases selected by Danny in a webpage, highlights or download of texts or images in a webpage by Danny, Danny's mouse movements including hovers and clicks in a webpage, Danny's social networking information, etc. It is appreciated that once Danny's interest/intent is determined, the relevant content that includes services/products that may be of an interest to Danny may be created on the fly based on some heuristics and subsequently presented to Danny. In one embodiment, a plurality of content may be stored, and in response to user attributes satisfying one or more criteria a particular content from the plurality of content may be selected for rendition thereof.

In some embodiments, Danny's attributes may be used to determine Danny's intent to purchase a product or a service, in his capacity as a representative of BioPharma. As such, CallidusCloud® may offer services/products based on Danny's intent, thereby improving leads generation. In some embodiments, Danny's intent to purchase may be categorized, for instance, as "Ready to Buy" or "Just looking for information." In some embodiments, Danny's intent to purchase may be a calculated as a numeric value based on his attributes. In some embodiments, Danny's intent to purchase may be determined and calculated as disclosed in U.S. patent application Ser. No. 12/618,126, entitled "SYSTEM AND METHODS FOR INFERRING INTENT OF WEBSITE VISITORS AND GENERATING AND PACKAGING VISITOR INFORMATION FOR DISTRIBUTION AS SALES LEADS OR MARKET INTELLIGENCE" by Kumar et al., filed on Nov. 13, 2009, which is incorporated herein in its entirety and for all purposes.

After Danny's interest is determined, e.g., offerings related to human resources, the dynamic content component may display information about a product/service offered by CallidusCloud® called "Hiring Cloud," that is related to human resources offerings. Here, the tabbed region 104 of the dynamic content component 102 may also provide a promotion of "20% Off Hiring Cloud" coupon in addition to providing information regarding the "Hiring Cloud" software (not shown).

In one embodiment, responsive to a user selection, the dynamic content component 102 may display additional content about the Hiring Cloud products/services offered by CallidusCloud®. For example, in response to a user clicking within the dynamic content component 102, additional information regarding the Hiring Cloud products/services from CallidusCloud® may be rendered. It is appreciated that the additional information may be in any format, e.g., a link to a webpage about Hiring Cloud, an icon to download data about Hiring Cloud, an icon to render non-text information about Hiring Cloud, a form to be filled out in order to receive additional information, etc.

Figure 1B:
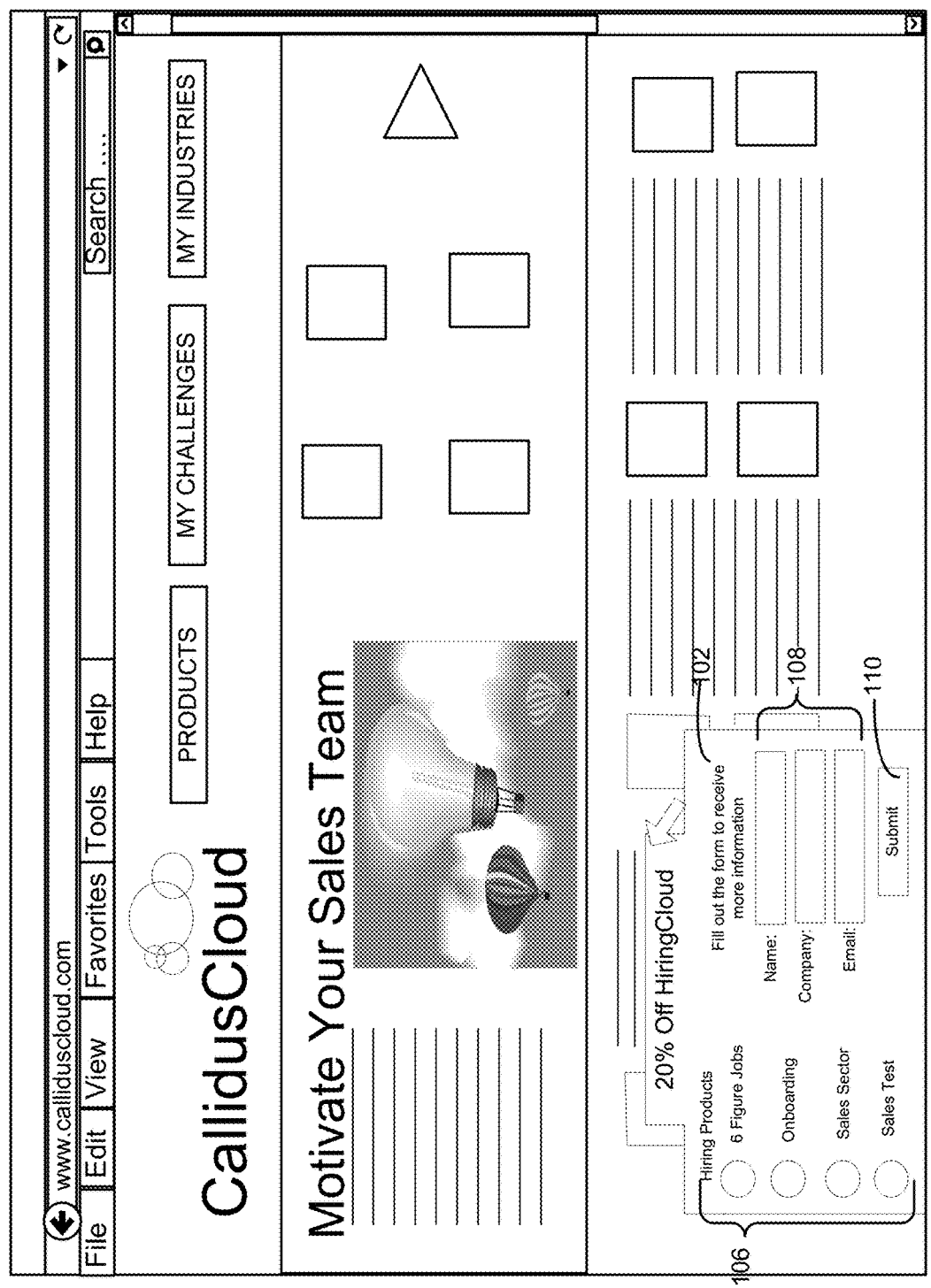

Rendition of additional information in different format is illustrated in FIGS. 1B-1F. Referring to FIG. 1B, once Danny selects the dynamic content component 102, the dynamic content component changes size and displays additional information about the Hiring Products 106. In this example, the Hiring Products 106 include: 6 Figure Jobs, Onboarding, Sales Sector, and Sales Test. The dynamic content component 102 may further include a fillable form 108 with textboxes to receive Danny's information, such as his name, the company he works for and his email address. According to one embodiment, the fillable form 108 may include dropdown menus that the user can select from along with textboxes if necessary. In some embodiments, form 108 may auto populate Danny's information into the form 108. For instance, a server may query Danny's information from a database or access his information from an online social networking website, such as LinkedIn®, Twitter® and/or Facebook®. Once form 108 is completed and submit button 110 is selected, then Danny's information is saved as a potential sales lead.

It is appreciated that in some embodiments, Danny's information may be determined and stored as a potential customer without Danny providing information into the form 108. For example, Danny's selection of the dynamic content component 102 may trigger a process to aggregate Danny's information from a third party server or an online social networking website, and storing the aggregated information as a potential customer.

Figure 1C:
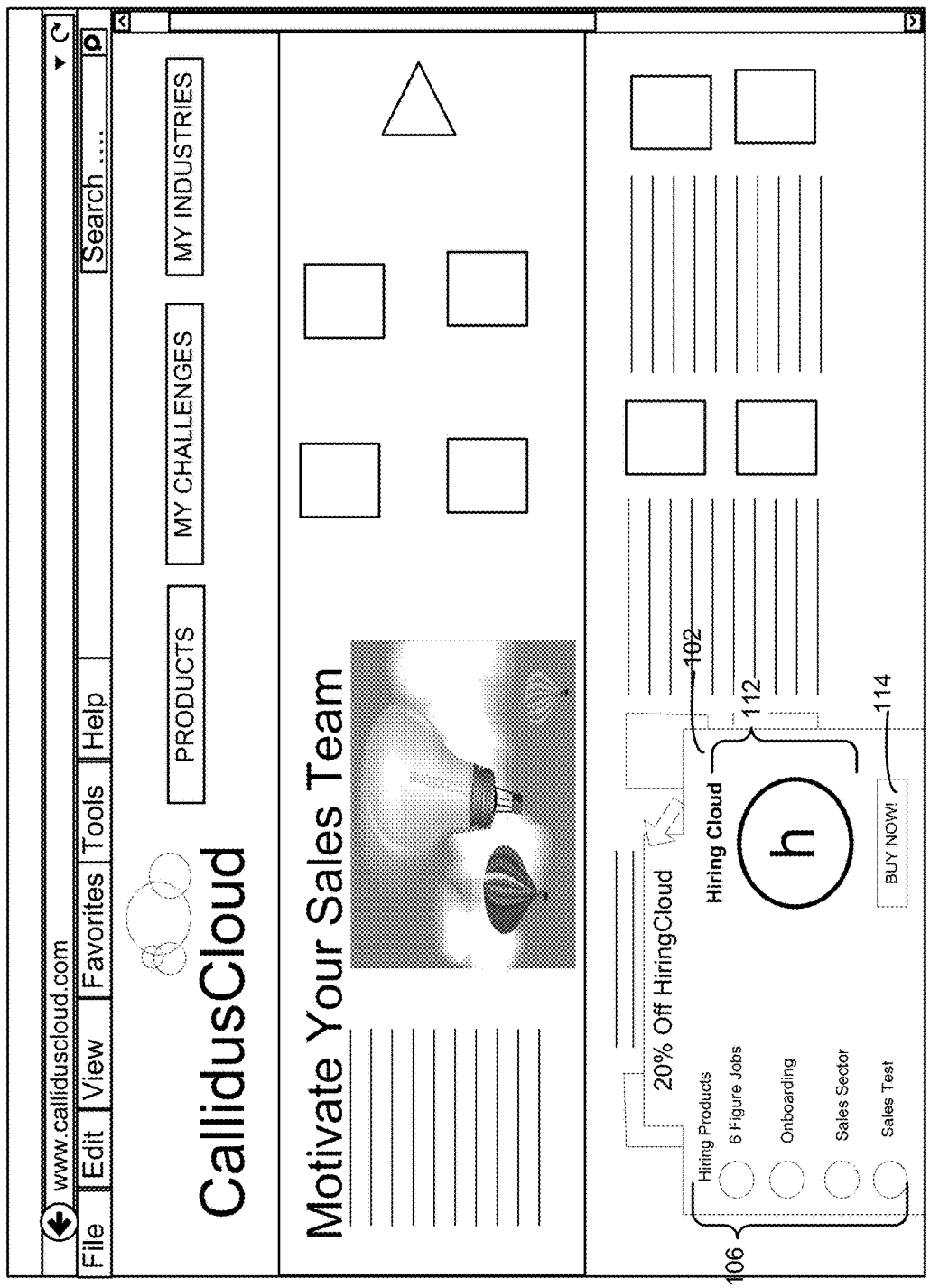

Referring now to FIG. 1C, dynamic content component 102 may display information about hiring products 106, a hiring cloud image 112, and a "BUY NOW!" button 114. Button 114 may be configured to initiate a financial transaction. According to one embodiment, when button 114 is selected, additional window may pop-up or the user may be redirected to another webpage to allow the purchase of the Hiring Cloud at a 20% discount to be completed.

Figure 1D:
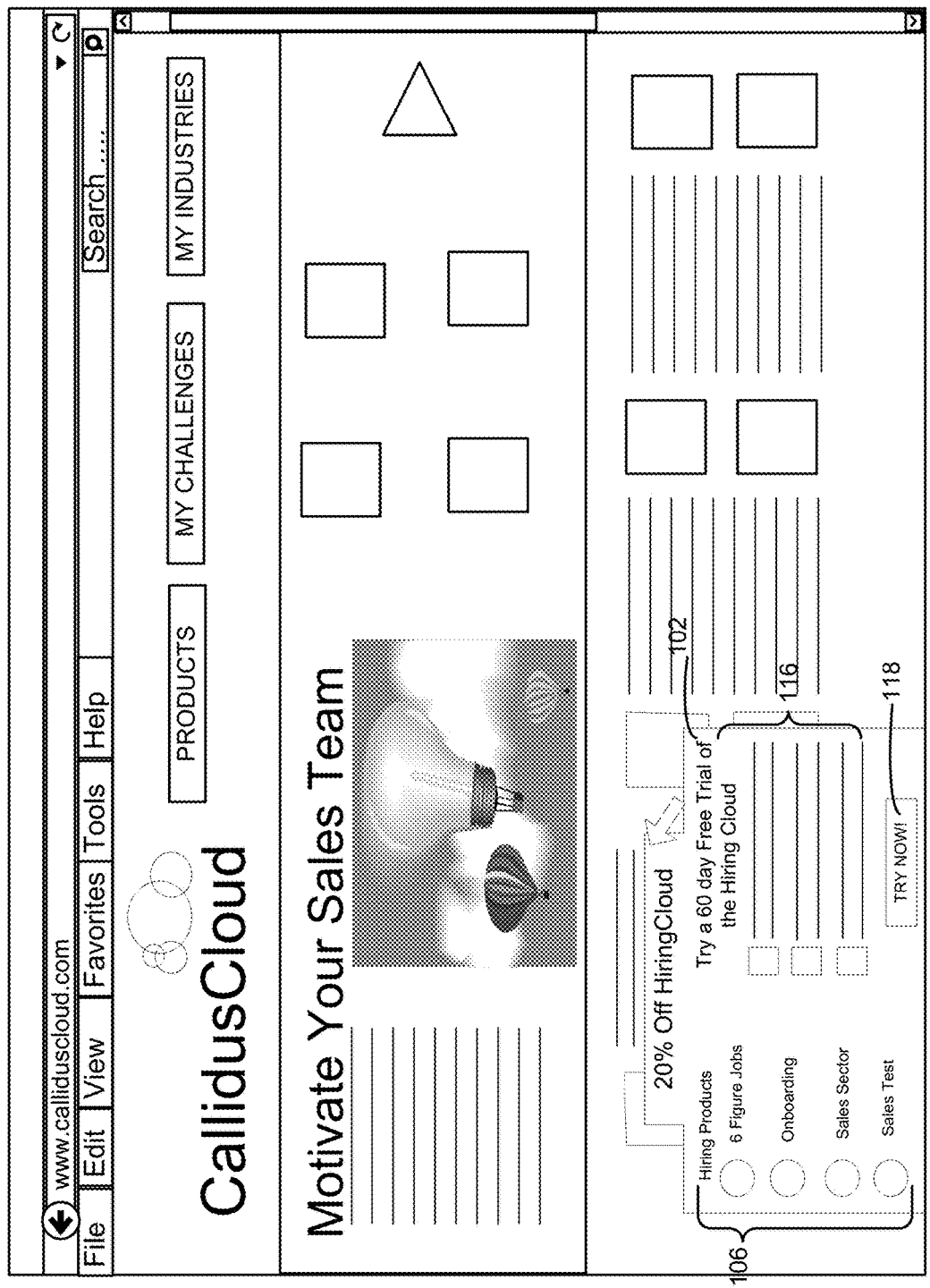

Referring now to FIG. 1D, dynamic content component 102 may display information 116 about a free trial of the Hiring Cloud and includes a "TRY NOW!" button 118 to initiate the free trial. In some embodiments, button 118 may be configured to redirect the user to another webpage to initiate a free trial of the Hiring Cloud. In some embodiments, button 118 may initiate a download of the Hiring Cloud to a user's computing device, such as a laptop or a mobile device. It is appreciated that in one embodiment, the button 118 may enable the user to remotely select the device to which the Hiring Cloud software is to be downloaded to.

Figure 1E:
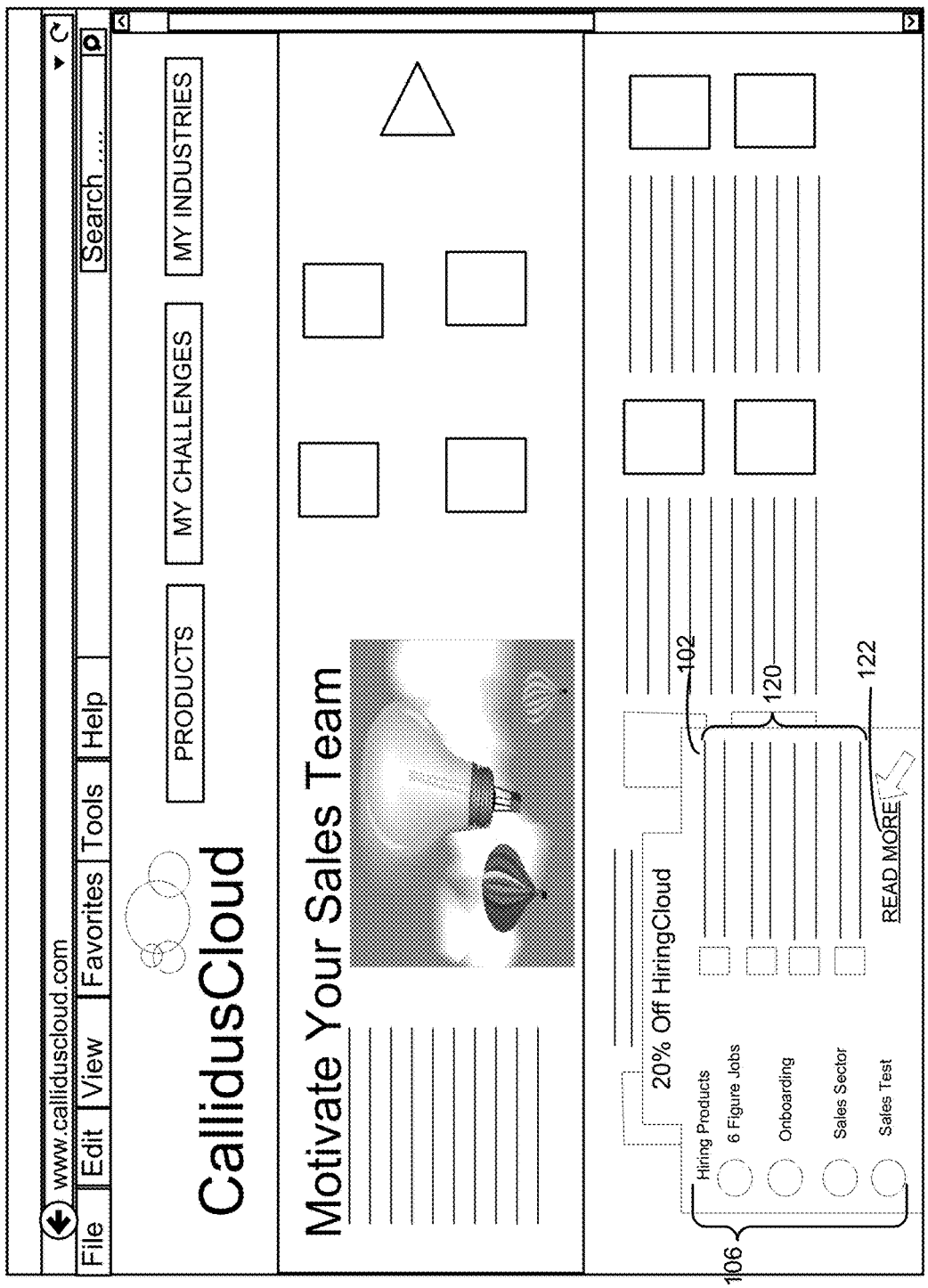
Figure 1F:
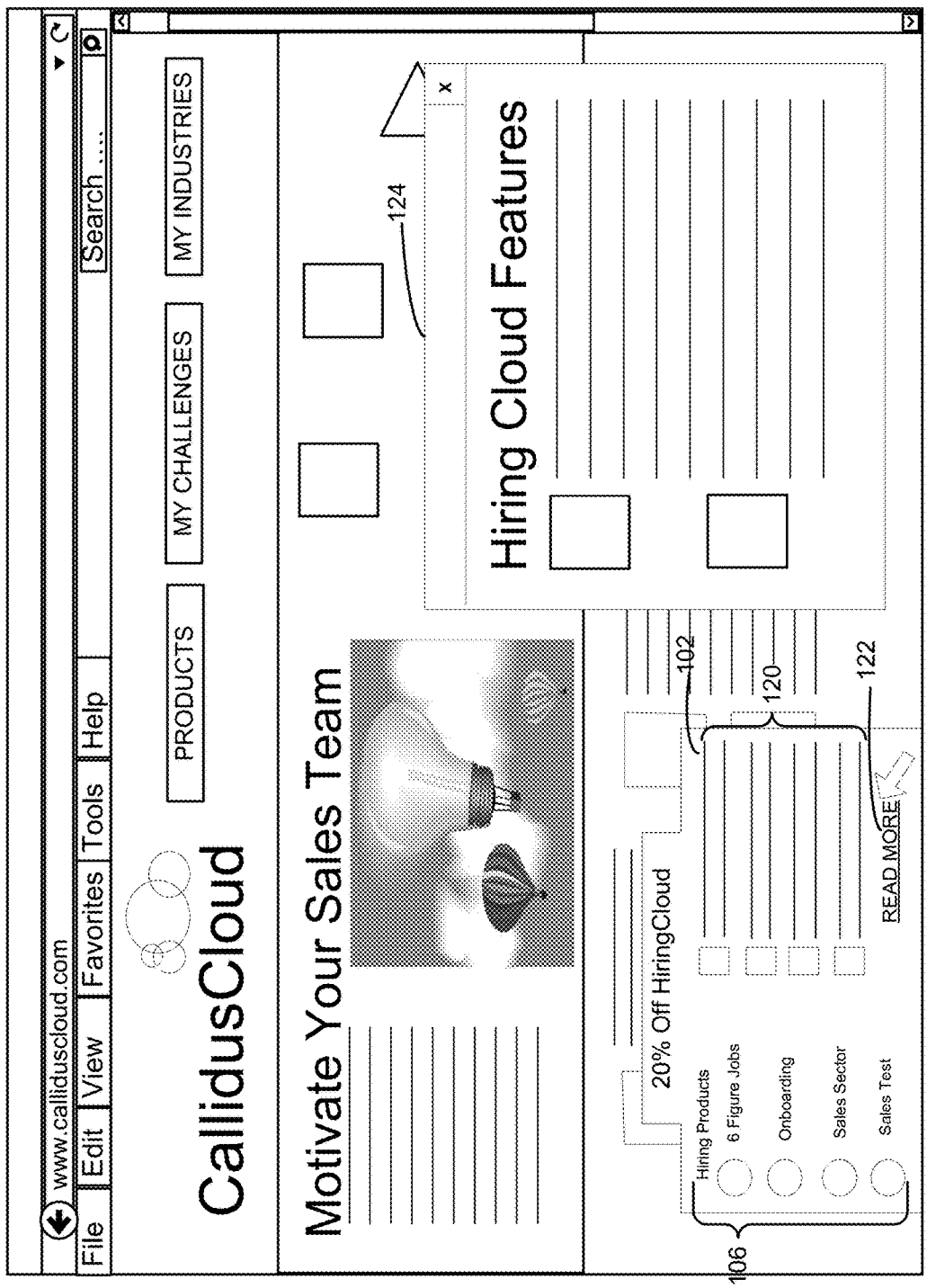

Referring now to FIG. 1E, dynamic content component 102 includes additional information 120 about the Hiring Cloud and a hyperlink "Read More" 122. In one embodiment, a new window is popped up to provide additional information about features of the Hiring Cloud if the hyperlink "Read More" 122 is selected, as illustrated by window 124 in FIG. 1F. In some embodiments, Danny may be directed to a different webpage upon selection of hyperlink 122.

As illustrated by FIGS. 1B-1E, different types of content may be displayed in a dynamic content component. It is appreciated that different types of content displayed by the dynamic content component is illustrative and not intended to limit the embodiments herein.

As discussed above, the type of content displayed in a dynamic content component may be based on a user's intent, e.g., to purchase a product/service for the user's organization. For example, in FIGS. 1A-1F, if it is determined that Danny is in the early stages of purchasing products and services, then it may be determined that he is only interested in receiving information about products/services and not actually purchasing it yet. As such, as illustrated in FIG. 1E, the dynamic content component may display content from CallidusCloud®, as a link. It is appreciated that rendering content using a link is exemplary and not intended to limit the scope of the embodiments. For example, an icon to download or access a whitepaper, an article, a case study or other information may be used instead.

In FIGS. 1A-1F, if it is determined that Danny is in the later stages of purchasing products/services, then it may be determined that he has a high intention to purchase products/services. As such, the dynamic content component may display content regarding the Hiring Cloud products/services by CallidusCloud®, e.g., textual information, non-textual information, etc. Furthermore, the dynamic content component may display a form to receive Danny's information, an icon to initiate a financial transaction, or a free trial for the Hiring Cloud, as illustrated in FIGS. 1B-1D, respectively. Thus, the content displayed in the dynamic content component is tailored to each visitor based on the visitor's attributes, e.g., intent.

Figure 2A:
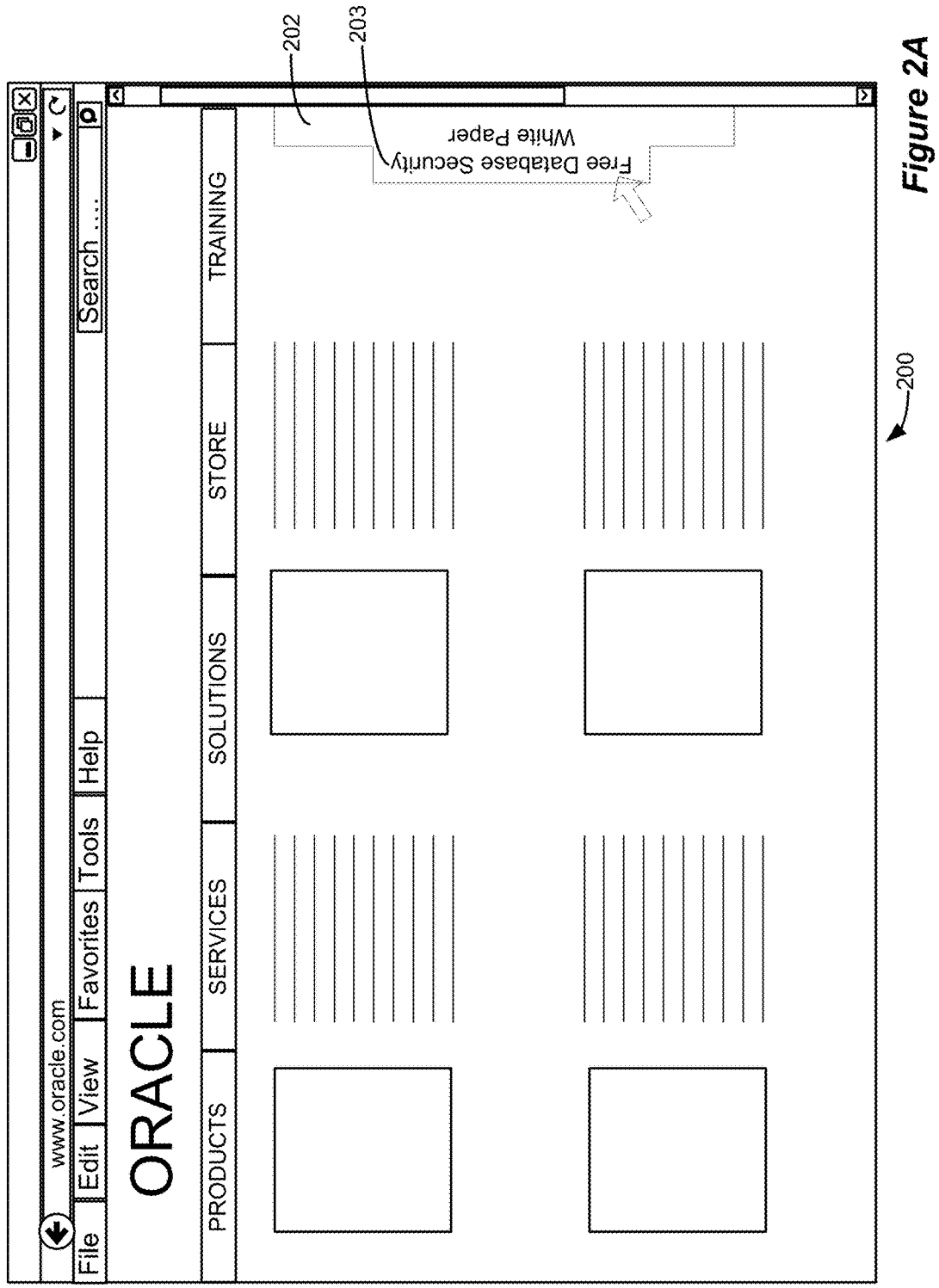
FIGS. 2A-2D show a dynamic content component for rendering different content for different users accessing the same webpage according to one embodiment.
Figure 2B:
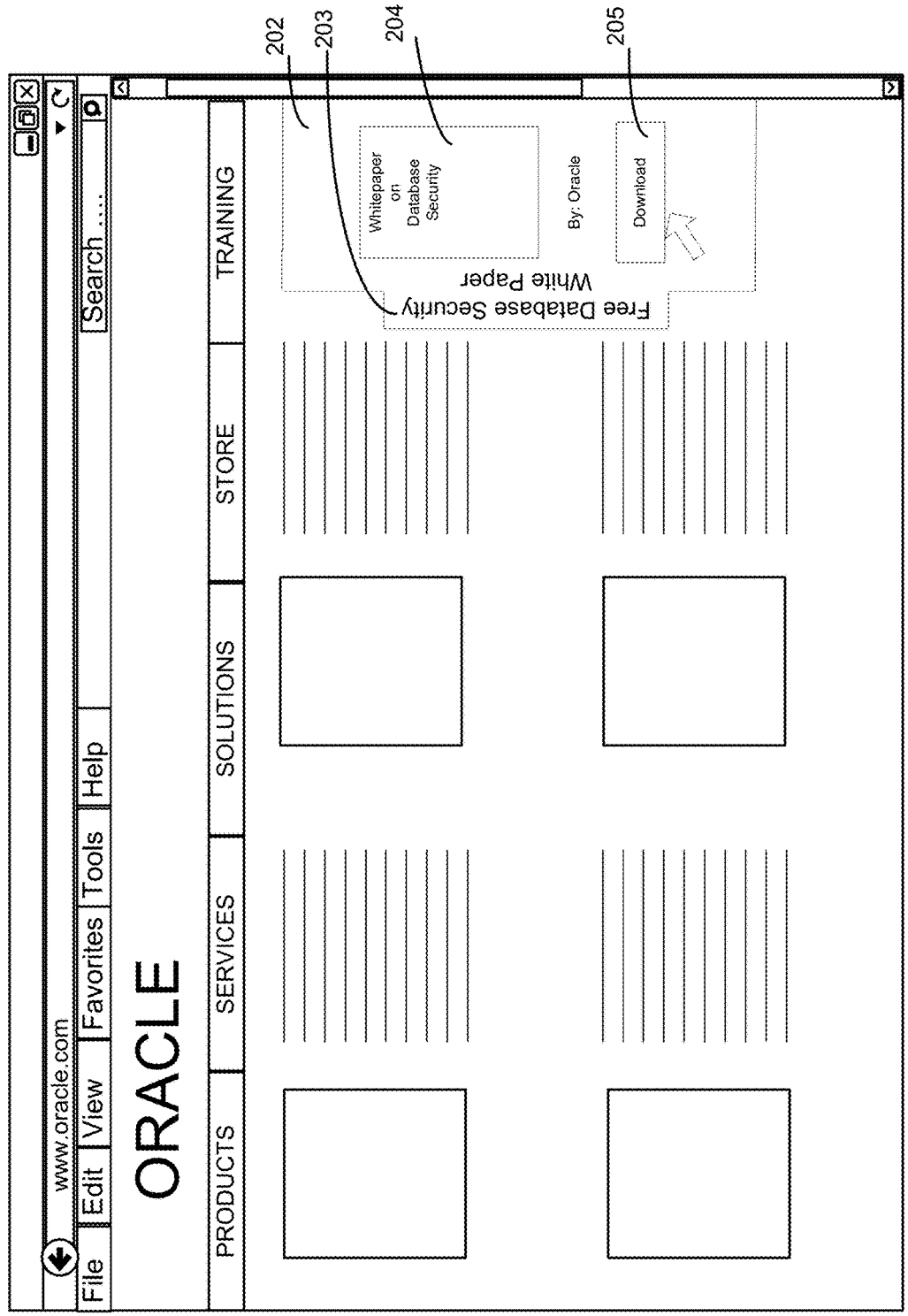

Referring now to FIGS. 2A-2D, FIGS. 2A-2D show a dynamic content component for rendering different content for different users accessing the same webpage according to one embodiment. FIGS. 2A-2D are described with reference to users, Erica and Frank, accessing webpage 200 to further illustrate content customization based on their respective attributes. Erica, an Information Technology (I.T.) Engineer at Orange Tech, accesses Oracle's® website 200 as illustrated in FIG. 2A. Erica's attributes may be used to determine her interests. In this example, it may be determined that Erica is interested in content related to database security partially based on her web browsing history. It may be determined that Erica performed searches for terms, such as "database," "security," "firewall," and "database masking." Erica's interest may be further determined based on her title as an "I.T. Engineer," at Orange Tech with 50 employees and a yearly revenue of $1 million. Based on these attributes, it may be determined that Erica is interested in content related to database security. In this example, because Orange Tech is a small company with a modest revenue, it may be further determined that Orange Tech will likely not purchase a product or service related to database security in the immediate future. As such, the relevant content for display in component 202 may be limited to a white paper 203 on Database Security published by Oracle. It is appreciated that the whitepaper 203 may be available for download. For example, the dynamic content component 202 may be resized to display more information, e.g., whitepaper 204, regarding the whitepaper 203 when the component 202 is selected, as illustrated in FIG. 2B. It is appreciated that the whitepaper 204 may be downloaded by selecting button 205 or the download may occur automatically.

In one example, it may be determined that because Orange Tech is a small company with a modest revenue, it will most likely purchase a product/service that is inexpensive. As such, the relevant content for display in component 202 may be a low-end product/service related to database security (not shown).

In contrast, when Frank, an I.T. Engineer from Frisco, accesses Oracle's® website 200, the dynamic content component 202 in FIG. 2C displays different information in comparison to the dynamic content component 202 as illustrated in FIGS. 2A and 2B. In this example, it may be determined that Frank is also interested in database security based on information gathered about Frank. For example, it may be determined that Frank is an I.T. engineer at Frisco, visited Oracle's® webpage a few dozen times in the past week and researched about database security. Further, it may be determined that Frisco has over 7000 employees with a $1 billion in revenue. Based on these attributes, it is determined that Frank is also interested in content related to database security. In this example, because Frisco earns $1 Billion in revenue and that it has over 7000 employees, it may be determined that Frank is more likely to purchase a product from Oracle® at a higher price in comparison to Orange Tech. Thus, it may be determined that the content relevant to Frank is a free trial of Oracle's database security software, and component 202 of FIG. 2C displays an offer for a "30 Day Free Trial Oracle Database Security Software" 206.

Figure 2C:
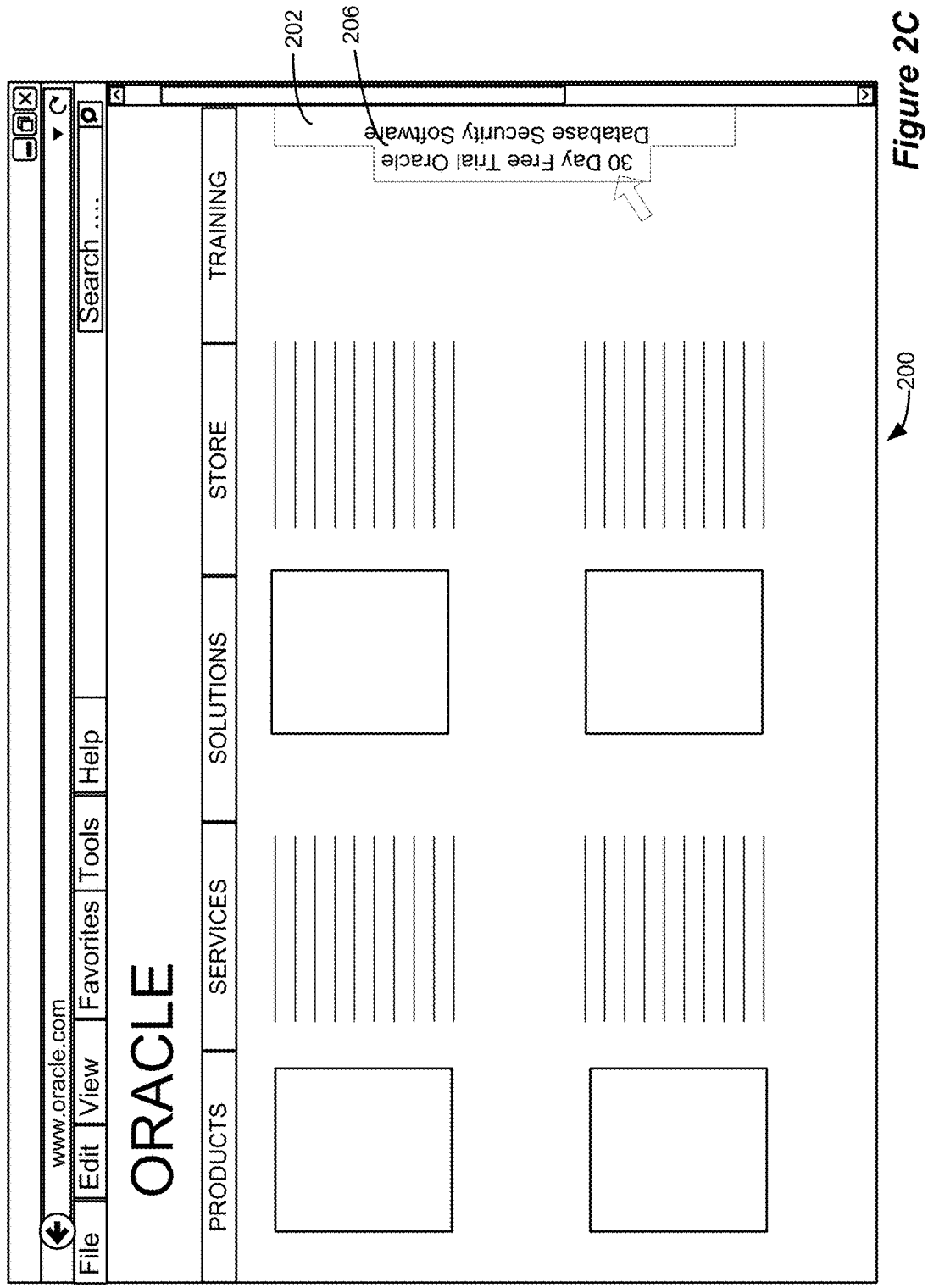
Figure 2D:
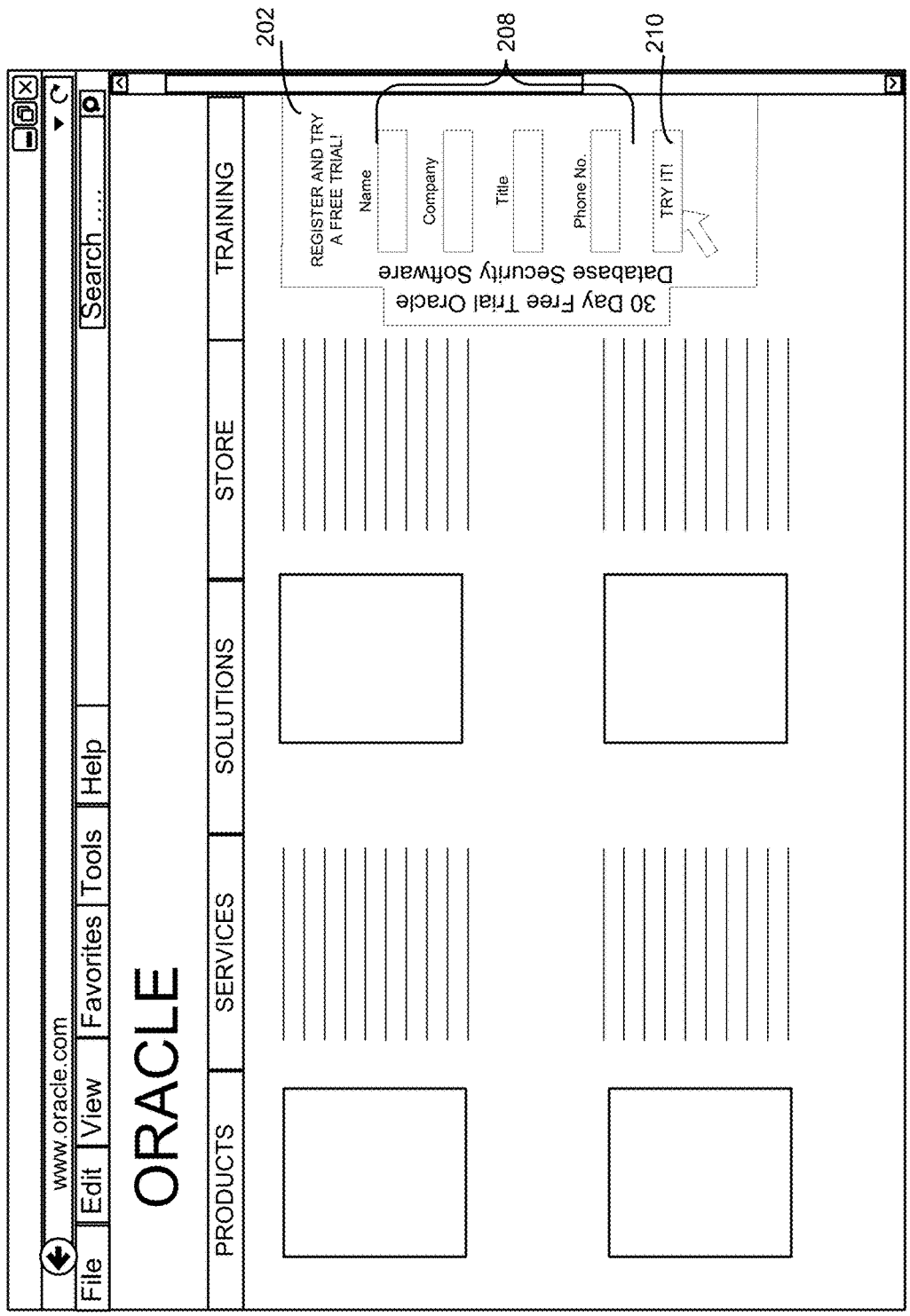

Selection of component 202 in FIG. 2C may cause the window to expand and to additionally display a form 208 along with a "TRY IT" button 210 to provide Frank access to the free trail, as shown in FIG. 2D. It is appreciated that the form 208 may be used to obtain additional information from Frank in order to provide a more customizable product/service offering.

Although Erica and Frank in the above noted examples visited the same webpage 200 and were interested in database security, each viewed different content in the dynamic content component based on their attributes. As the example illustrates, the content displayed to different users is tailored in a manner that will likely result in a sales lead and ultimately a sale of a product or service offered by a business organization.

Figure 4:
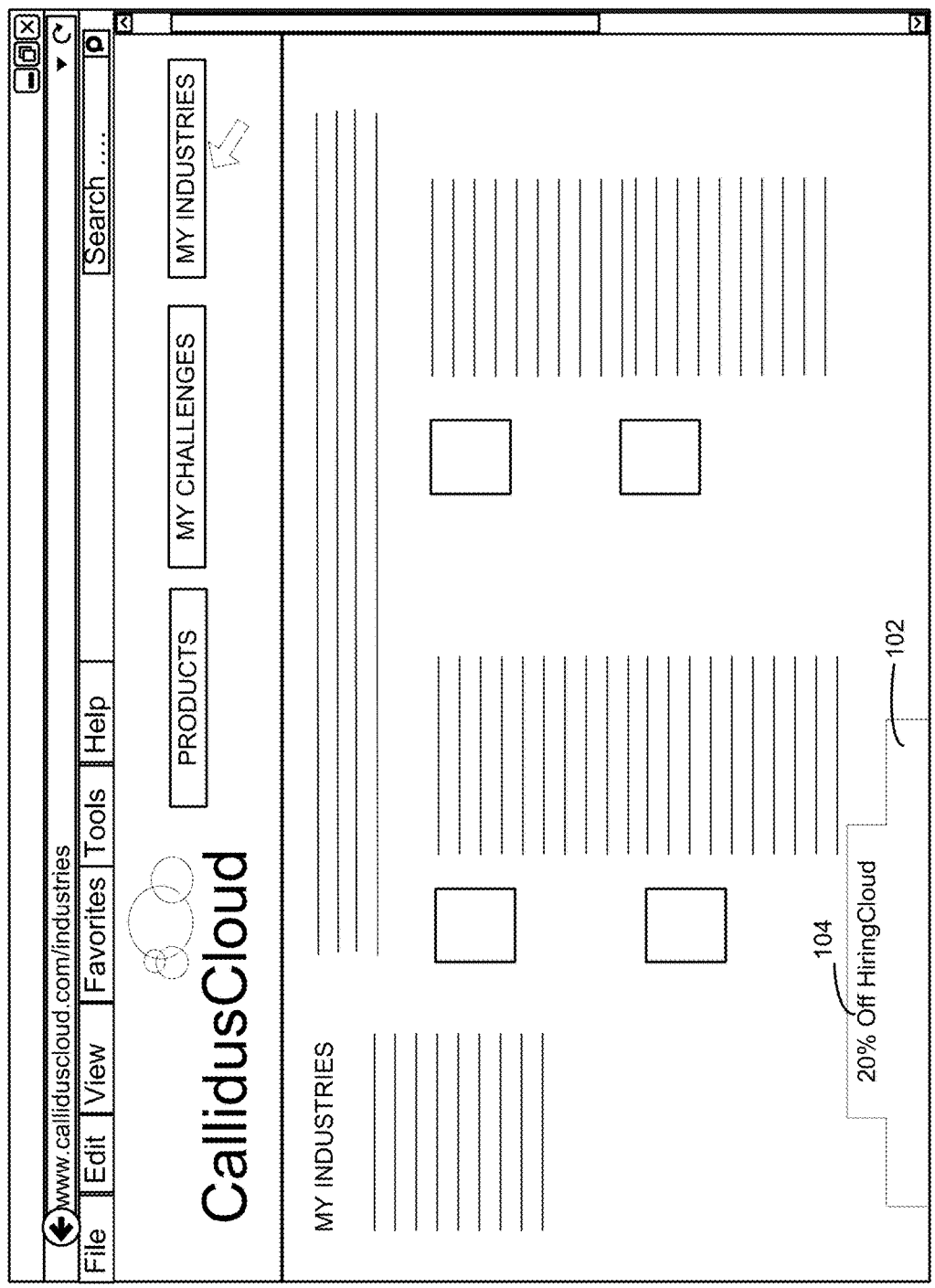
FIG. 4 shows an example webpage including the same dynamic content component of FIG. 1A after a user navigates from webpage 100 according to one embodiment.

In some embodiments, a dynamic content component may be positioned within a webpage such that it does not interfere with the webpage content. For example, in FIG. 1A, the dynamic content component 102 is a tabbed folder and includes a promotional offer of "20% Off Hiring Cloud" 104 and is positioned strategically to pique the visitor's curiosity. Further, by strategically positioning the dynamic content component 102 near the lower left hand corner of the webpage 100, a visitor may browse different content of different webpages of a website, while the dynamic content component 102 is continuously and prominently displayed. For example, a visitor could navigate away from Callidus-Cloud® main webpage 100 of FIG. 1A to a webpage 400 as shown in FIG. 4. As FIGS. 1A and 4 illustrate, the dynamic content component 102 remains near the lower left hand corner of the webpage to continuously lure the visitor's attention to the "20% Off Hiring Cloud" promotion displayed in the dynamic content component 102, without interfering with the visitor's viewing experience of different content of the different webpages (e.g., 100 and 400). In this way, the visitor is continuously and subtly reminded about the dynamic content component 102, and may click on the dynamic content component when she desires. Further, it is appreciated that in some embodiments the dynamic content component may be configured to display content relevant to a user for a predetermined period of time, rather than continuously.

Figure 3A:
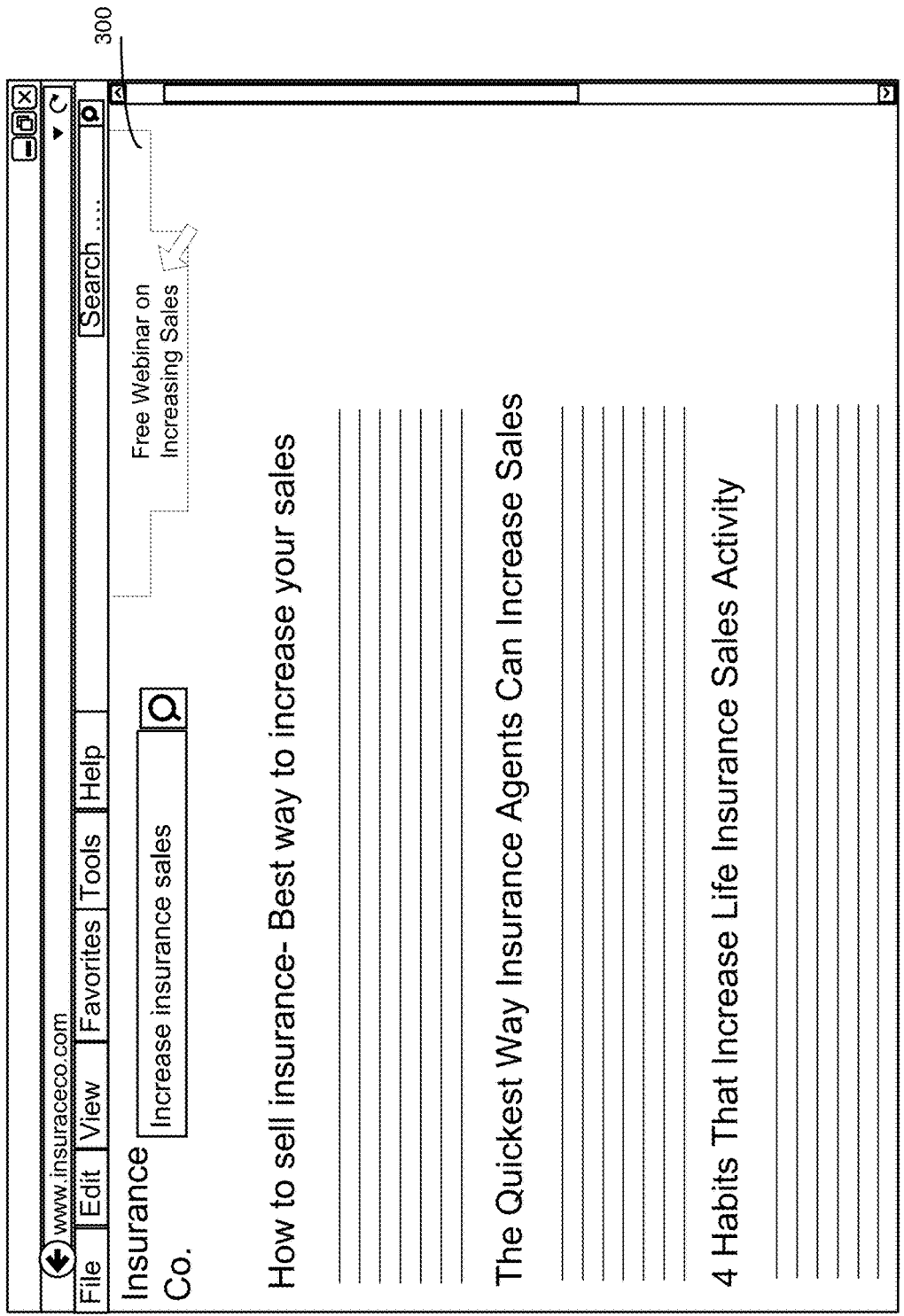
FIGS. 3A-3B show an exemplary position of a dynamic content component within a webpage according to one embodiment.
Figure 3B:
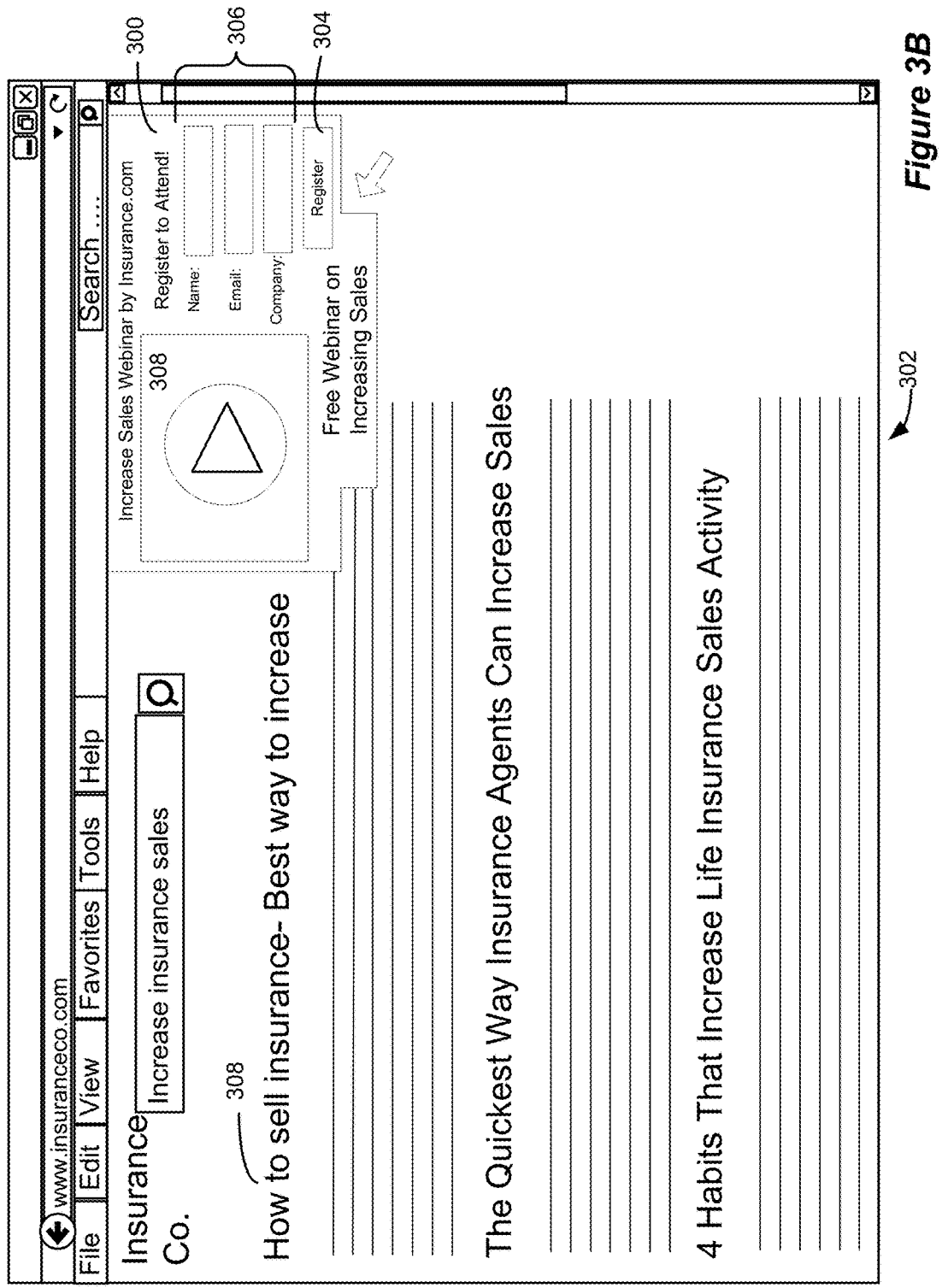

In some embodiments, a dynamic content component may be positioned near a right edge of the webpage as depicted in FIGS. 2A-2D. Referring now to FIGS. 3A-3B, FIGS. 3A-3B show an exemplary position of a dynamic content component within a webpage according to one embodiment. In FIG. 3A, a display component 300 is positioned near a top right hand corner of webpage 302 and displays information about a "Free Webinar on Increasing Sales." When the display content component 300 is selected, it changes size to display more details about the webinar as illustrated in FIG. 3B. In FIG. 3B, when the "Register button" 304 is selected after form 306 is completed, then the webinar 308 may be rendered within the display content component 300 or rendered in a separate window. As FIGS. 3A-3B illustrate, by positioning the dynamic content component near the upper right hand corner of a webpage, the dynamic content component 300 is conspicuously visible to the user without interfering with the content 308 of webpage 302.

In some embodiments, a dynamic content component may be positioned at a corner of a webpage. In some embodiments, a dynamic content component may be positioned away from an edge of the webpage. In some embodiments, a webpage may include multiple dynamic content display components located in multiple locations of a webpage. In some embodiments, a dynamic content component is positioned in a region of a webpage that allows a user to view and browse the webpage, without being obstructed by the dynamic content component.

Figure 5:
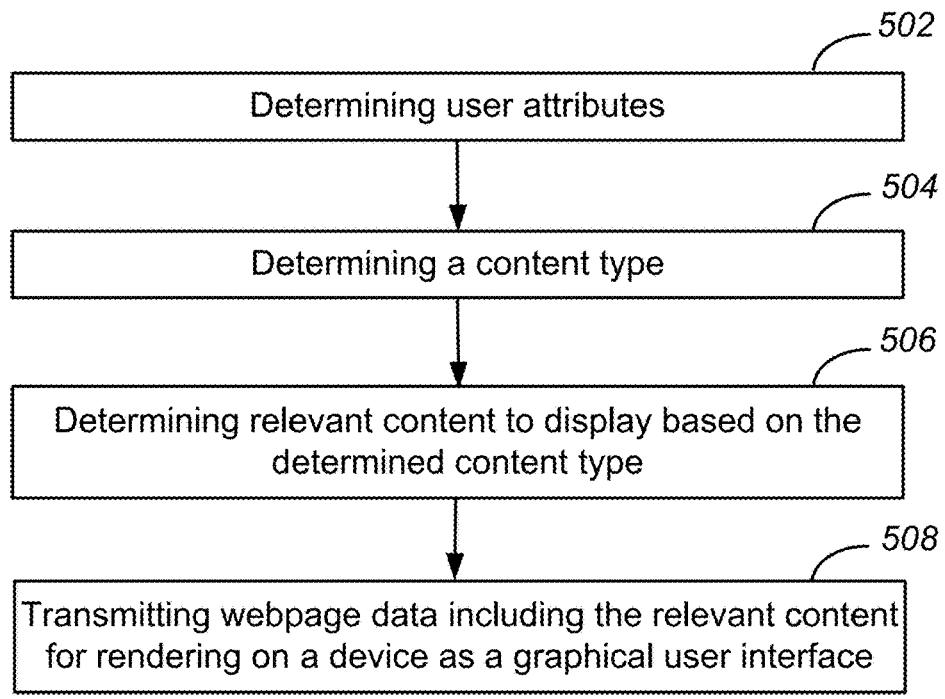
FIG. 5 shows one exemplary method to display content of a dynamic content component according to one embodiment.

Referring now to FIG. 5, FIG. 5 shows one exemplary method to display content of a dynamic content component according to one embodiment. In some embodiments, servers or computing devices, such as laptops, computers or mobile devices may be configured to implement all or parts of method 500.

At step 502, user attributes are determined. As noted previously, in some embodiments, a user attribute may be a location of a user, a web browsing history of the user, revenue of a business organization associated with the user, a size of the business organization associated with the user, user selection of information related to a hyperlink, social networking information associated with the user, etc.

In some embodiments, a user's attributes may be determined in response to receiving a request to access a webpage. For instance, the user's request may include an IP address that identifies the user and a business organization associated with the user. For example, a server that receives the request to access the webpage may use the IP address to determine the origin of the request, and further perform a database query to determine which user and/or business organization corresponds to the IP address.

In some embodiments, the request to access a webpage may include a token that may be used to determine user attributes. For example, the token may be used to access a user's online social networking information. In this example, one or more servers of a network may use the token to communicate with an application programming interface (API) of the one or more servers of an online social networking provider, such as LinkedIn®, Twitter® and/or Facebook® but not limited thereto. Once the token is validated, a user's information may be accessed such as, name, employer information, geographic location, title in a business organization, etc.

Further, based on the identification of the business organization, another search may be performed, on third party servers, for information about the business organization, such as industry sector, revenue, a number of employees, competitors of the business organization, suppliers of the business organization, and customers of the business organization, etc.

In some embodiments, user attributes may be determined based on user credentials received in a webpage access request. For example, a host server may receive a user's username and password to access a webpage. The host server may validate the username and password and further query a database to identify user attributes that correspond to the username and password.

At step 504, a content type is determined. In some embodiments, the content type is determined based on the user attributes determined in step 502. In some embodiments, user's interest in a type of content may be related to a product or a service needed by the user's business organization. In some embodiments, a user's interest in a type of content may be in a topic or some category of information that is related to the business organization that the user belongs to.

In some embodiments, a content type may be determined by using one or more servers or computing devices that query one or more databases for a content type that corresponds with a user's attributes. In some embodiments, a user's interest in certain type of content may be determined as described above with respect to FIGS. 1A-2D.

In some embodiments, a user's interest in a type of content may be related to a user's intent to purchase a service or a product offered by a business organization. For instance, a user's intent to purchase, as noted above, may be based on the user's attributes and determined as disclosed in U.S. patent application Ser. No. 12/618,126, entitled "SYSTEM AND METHODS FOR INFERRING INTENT OF WEBSITE VISITORS AND GENERATING AND PACKAGING VISITOR INFORMATION FOR DISTRIBUTION AS SALES LEADS OR MARKET INTELLIGENCE" by Kumar et al., filed on Nov. 13, 2009, which is incorporated herein in its entirety and for all purposes. Based on the user's intent to purchase a product or a service, it may be determined that the user is interested in information related to the identified product or service. In some embodiments, a user's interest in a type of content may be independent of a user's attributes, e.g., based on user input.

At step 506, relevant content to display is determined based on the content type determined at step 504. In some embodiments, the relevant content may be a service or a product related to the business needs of business organization associated with the user. For example, the relevant content may include information about an event or a news article related to the business organization. In one example, the relevant content may be related a person or a group in the business organization of the user. In some examples, the relevant content may include a technology and/or industry sector related to the business organization of the user.

In some embodiments, the relevant content may be determined by querying a database for content that corresponds with the user's interest in a content type determined in step 502. For instance, FIG. 6 shows an exemplary table for determining relevant content for a dynamic content component according to one embodiment. In some embodiments, table 600 may be stored on a server, and queried for the relevant content. Here, table 600 includes a column 602 with a predefined list of content types that may be of interest to a user based on the user's attributes and a corresponding column 604 with a predefined column of relevant content.

If it is determined that a user is interested in content related to human resources products, then table 600 is queried. Accordingly, "Video Tour of Hiring Cloud" 610 that corresponds to a human resources product offered by a business organization is identified as the relevant content to display in a dynamic content component of a webpage. In another example, if it is determined that a user is interested in content related to marketing 612, then a query of table 600 will identify the "Marketing White Paper" 614 as the relevant content. It is appreciated that the content type of interest and its corresponding relevant content may be as granular as desired. As such, having a one to one mapping, as shown, is illustrative and not intended to limit the scope of the embodiments.

Returning to step 506, the relevant content may be determined based on a combination of a user's attributes and the user's interest in a content type as determined in step 504. For example, FIG. 7 shows an exemplary table for determining relevant content for a dynamic content component based on user's attributes according to one embodiment. Table 700 includes a column 702 of content types and a column with user attributes 704, and a corresponding column 706 identifying the relevant content to display in a dynamic content component of a webpage. If it is determined that a user accessing a B2B company's website is interested in content related to human resources, and that a business organization associated with the user has less than 50 employees and a revenue of less than $5 million, then the relevant content to display in a dynamic content component is information about a hiring cloud product offered by the B2B company and a form to receive information from the user, as shown in row 708 of FIG. 7.

In contrast, if it is determined that the business organization associated with the user employees between 50-1000 employees and has a revenue between $5-30 million dollars, then a video tour is determined as the relevant content, as shown in row 710 of FIG. 7. In another example, if it is determined that a business organization associated with the user employs over 1000 employees and has a revenue of over $30 million, then it is determined that the "60 Day Free Trial of Hiring Cloud" is the relevant content, as shown in row 712 of database table 700. As FIG. 7 illustrates, different content may be displayed to different users based on their attributes even if their content type of interest is the same.

Although FIG. 7, illustrates table 700 including a column 702 of user's interest in a content type, column 704 with user attributes and column 706 with the relevant content, in other embodiments, table 700 may have more or fewer columns. For example, in some embodiments, a table may be configured to only include column 704 and column 706. As such, in this example, the relevant content may be determined by querying the table for content that corresponds to the user's attributes. Furthermore, although column 704 displays two attributes, column 704 may include a list of more or fewer than two attributes.

Returning to step 506, the relevant content may be based on a type of content determined in step 504 and further based on a user's intent to purchase a product or service to fulfill a business need of a business organization that the user is a part of. As noted above, a user's intent to purchase a product or service may be determined as disclosed in U.S. patent application Ser. No. 12/618,126, entitled "SYSTEM AND METHODS FOR INFERRING INTENT OF WEBSITE VISITORS AND GENERATING AND PACKAGING VISITOR INFORMATION FOR DISTRIBUTION AS SALES LEADS OR MARKET INTELLIGENCE" by Kumar et al., filed on Nov. 13, 2009, which is incorporated herein in its entirety and for all purposes.

In an illustrative example, FIG. 8 shows an exemplary table for determining relevant content of a dynamic content component based on a user's intent according to one embodiment. Table 800 includes a column 802 with a list of content types that may be of interest to a user and column 804 with a list of different user's intents, and corresponding column 806 with a list of relevant content to display in a dynamic content component.

In this example, if it is determined that a user is interested in human resources products, the relevant content may further depend on the user's intent to purchase a product or service related to human resources. As such, if a user's intent is "Ready to Buy," then the relevant content includes a "60 Day Free Trial of Hiring Cloud," a human resources product, as shown in row 808 of table 800. However, if the user has a "low intent" or is "Just Looking for Information," then the relevant content is determined to be a video tour about a human resources product or a white paper on employee management as shown in rows 810 and 812, respectively. As the example illustrates, the content displayed in a dynamic content component may be tailored based on a user's intent purchase to encourage the user to take the next step in making a purchase, thereby increasing the number of sales leads and ultimately sales.

Although table 800 shows three columns (e.g., 802, 804 and 806), table 800 may include more or fewer columns. For example, a table may include column 804 with a list of user's intent and column 806 with a list of relevant content. In this example, relevant content may be determined by querying the table for content that corresponds to a user's intent to purchase. It is appreciated that tables in FIGS. 6-8 are exemplary and not intended to limit the scope of the embodiments. As such, any combination of tables in FIGS. 6-8 may be used to determine relevant content.

Returning to FIG. 5, at step 508, webpage data including the relevant content is transmitted for rendering on a device as GUI, such as the dynamic content component. In some embodiments, the webpage data may include customized computer code that may be executed on a server or a user's device to generate and display a dynamic content component in the webpage accessed by a user. In some embodiments, the webpage data may include data to generate a webpage on a display of the visitor's device. The webpage data may include text, images, and/or GUI components to generate a webpage on a user's device. The webpage data may further display additional content in response to a selection of a dynamic content component to form an updated dynamic content component (e.g., a form, text box, images, buttons, icons, drop down menus) on a display device.

Figure 9:
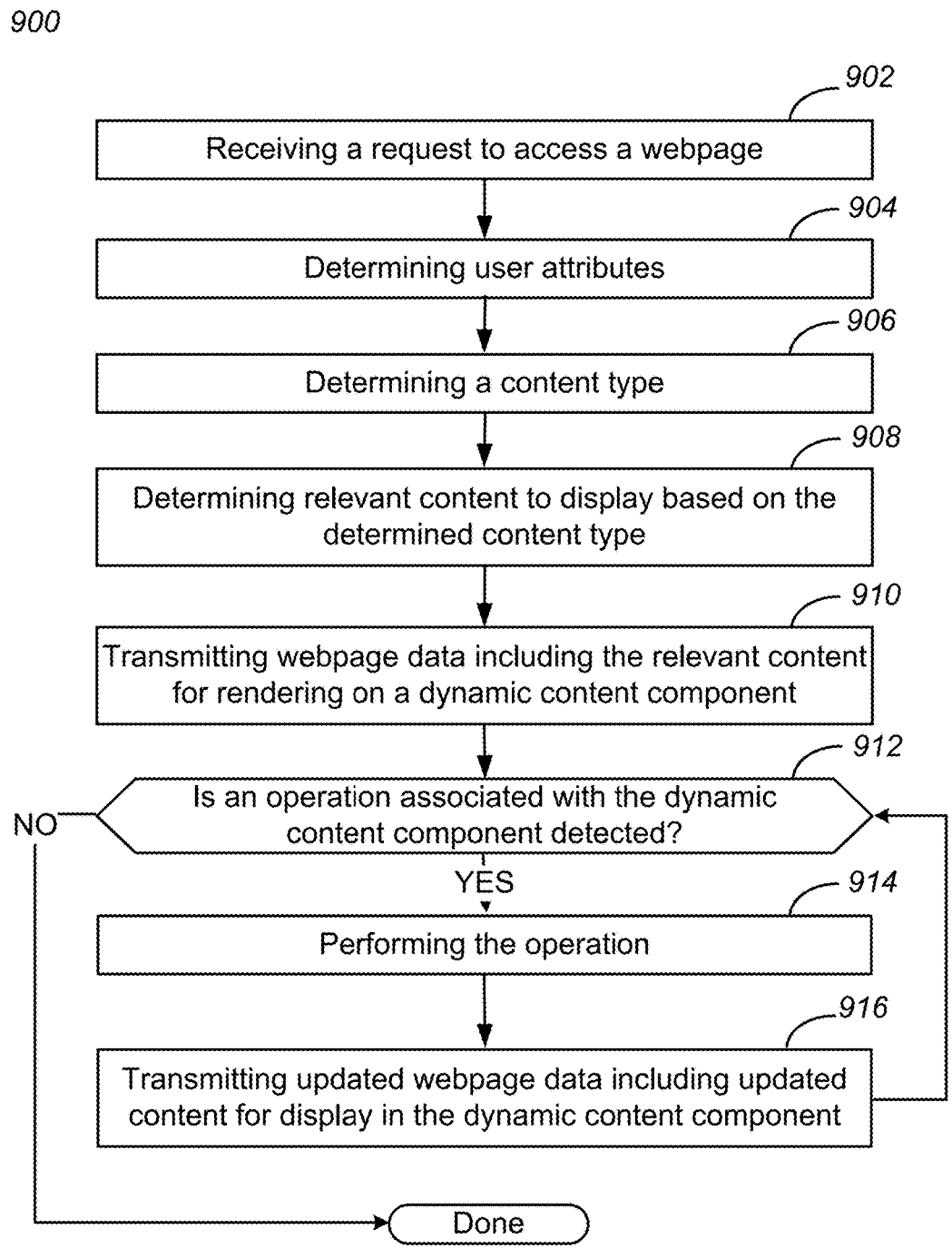
FIG. 9 shows one exemplary method to display content in a dynamic content component of a webpage according to one embodiment.

Referring now to FIG. 9, FIG. 9 shows one exemplary method to display content in a dynamic content component of a webpage according to one embodiment. In some embodiments, servers or computing devices, such as laptops, computers or mobile devices may be configured to implement all or parts of method 900. In some embodiments, steps 902-916 are not necessarily performed in the order shown in FIG. 9. Instead, these steps 902-914 may be performed in any order to display content in a dynamic content component. Further, in some embodiments, not all steps shown in FIG. 9 are performed.

At step 902, a request to access a webpage is received. In some embodiments, a request to access a webpage is received from a user's device. A request to access a webpage may be received in response to a server periodically polling a user's device to determine whether access to a webpage should be provided.

Steps 904-910, in some embodiments, may be implemented in a similar manner as described with respect to steps 502-508 of FIG. 5.

At step 912, it is determined whether an operation associated with the dynamic content component is detected. In some embodiments, the operation may be a selection of a dynamic content component. For example, with reference to FIG. 1A, if a user selects the dynamic content component 102, then it is determined that a selection operation is detected. In this example, the selection operation is detected when a communication is received by a server indicating that a user has selected the dynamic content component 102. Once it is determined that a selection operation has been detected, then the selection operation is performed (step 912) to expand the dynamic content component 102 to display additional information as shown in FIG. 1B.

In some embodiments, the operation may be a selection of a button or icon within a dynamic content component. For example, with reference to FIG. 1B, if a server hosting webpage 100 receives a communication that the submit button 110 was selected, then it is determined that an operation has been detected. In this example, the selection button 110 may cause the server to store user information provided in form 108 in a database (step 912). In another example, with reference to FIG. 1C, if a selection of button 114 is received by a server hosting webpage 100, it may cause the server to initiate a financial transaction (step 912). In this example, the user may be re-routed to another webpage to provide financial information, such as credit information, to process the transaction. Once the financial information is received, the server may perform operations to complete the financial transaction by communicating with a financial processing system.

In another example, with reference to FIG. 1D, if a communication is transmitted from a user's device to a server that button 118 is selected, then it is determined that an operation to provide a free trial of a Hiring Cloud software, a human resources product, has been detected. Accordingly, the server may be configured to allow a user access to the Hiring Cloud software stored computing environment (step 912). Alternatively, the server may be configured to download the Hiring Cloud software to the user's device. In another example, with reference to FIG. 3B, the selection of FIG. 304 may cause the user device to transmit a message to a server hosting webpage 302 that button 304 has been selected. Upon receiving this message, the server may store the user's information provided in form 306 and initiate the webinar 308 (step 912).

In some embodiments, if it is determined that an operation was not detected, then method 900 may end. In some embodiments, if it is determined that an operation was not detected, then method 900 may return to step 912 (not shown) to continue to monitor and determine whether an operation is detected.

If it is determined that an operation was detected, then method 900 proceeds to step 914. At step 914, the operation detected at step 912 is performed. In some embodiments, while a server performs an operation identified in step 912, the server may perform additional operations, e.g., gather and store information about a user accessing the webpage and interacting with the dynamic content component. In one example, the server may gather information, such as hyperlinks selected by the user, search terms, the user's location, the name of a business organization associated with the user, the size and revenue of the business organization associated with the user, the user's title and department within the business organization, the industry sector associated with the user's business organization, etc. The information gathered about the user may then be stored as information of a potential customer.

In some embodiments, a server hosting the webpage may execute a custom program to perform the operation. In some embodiments, a user's device may execute the operation performed at step 914. For instance, the user's device may perform an onClick event to change the size of a dynamic content component 102 of FIG. 1A to the size of dynamic content component 102 shown in FIG. 1B in response to the selection of the dynamic content component 102.

At step 916, updated webpage data including updated content for display in the dynamic content component is transmitted to the user's device. In some embodiments, the webpage data may include text, images, GUI components (e.g. a form, text box, images, buttons, icons, drop down menus, additional display windows) to use to update the display of a dynamic content component.

In some embodiments, once the updated webpage data is transmitted, then method 900 returns to step 912 to continue to monitor and detect additional operations associated with a dynamic content component.

In some embodiments, webpage data may not be transmitted from a server to a user's device. Instead, the webpage data may be updated using webpage data stored on the user's device. For instance, as noted above, an onClick event may be performed at a user's device and a dynamic content component may be updated using webpage data stored on a user's device to change the size of the dynamic content component to display additional content.

Figure 10:
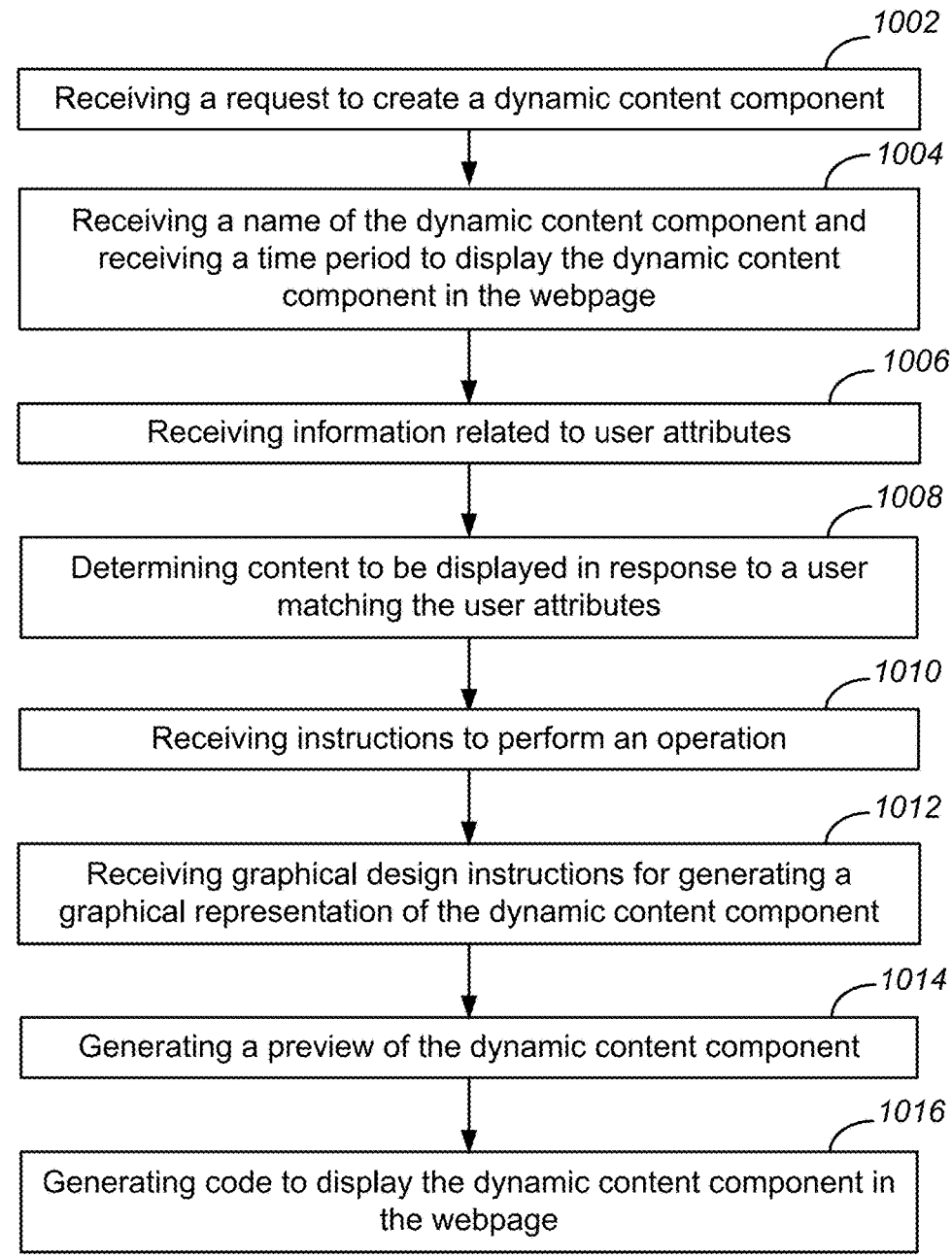
FIG. 10 shows one exemplary method to create a dynamic content component according to one embodiment.

Referring now to FIG. 10, FIG. 10 shows one exemplary method to create a dynamic content component according to one embodiment. In some embodiments, servers or computing devices may be configured to perform all or parts of method 1000. In some embodiments, steps 1002-1016 are not necessarily performed in the order shown in FIG. 10. Instead, these steps 1002-1016 may be performed in any order to create a dynamic content component. For example, steps 1006 and 1008 may be performed before step 1004. Further, in some embodiments not all steps shown in FIG. 10 are performed. For example, in some embodiments, generating a preview of a dynamic content component at step 1014 may be optionally performed.

Method 1000 is described in relation to FIGS. 11A-11J. FIGS. 11A-11J show exemplary GUIs used to create a dynamic content component according to one embodiment. The GUIs (1100, 1101, 1103, 1105, 1107, 1109, 1111, 1113, 1115 and 1117) may be a web-based interface or a program rendered to the user in order to create a dynamic content component. The GUIs (1100, 1101, 1103, 1105, 1107, 1109, 1111, 1113, 1115 and 1117) may include a form with textboxes, drop down menus, and other GUI buttons to define the content, images, and the graphical design of a dynamic content component. FIGS. 11A-11J are used to illustrate the process to create a dynamic content component, and not intended to limit the scope of the dynamic content component embodiments. For instance, while method 1000 and FIGS. 11A-11J illustrate creating one dynamic content component, in some instances, multiple dynamic content components may be created simultaneously using method 1000 and a GUI similar to the GUIs of FIGS. 11A-11J. Further, FIGS. 11A-11J illustrate creating one dynamic content component as part of a business organization's marketing campaign. As such, the creation of a dynamic content component described below may be referred, in some instances, as a creation of marketing campaign or vice versa.

In some alternative embodiments to using the GUIs of FIGS. 11A-11J, a user may select or be provided with a custom programming code to create a dynamic content component. For instance, a dynamic content component may be created and modified with use of a software package that includes a framework to create a dynamic content component. The custom programming code may be implemented using an object-oriented programming language, such as C++ or Java. The framework may define core object-oriented classes to allow a user or a system administrator to implement and override these classes to create a custom dynamic content component.

At step 1002, a request to create a dynamic content component is received. In some embodiments, the request to create the dynamic content component may be received in response to a user launching an application on the user's device to create the dynamic content component. In some embodiments, the request to create the dynamic content component may be received in response to a user accessing GUI 1100 of FIG. 11A via a web access.

Figure 11A:
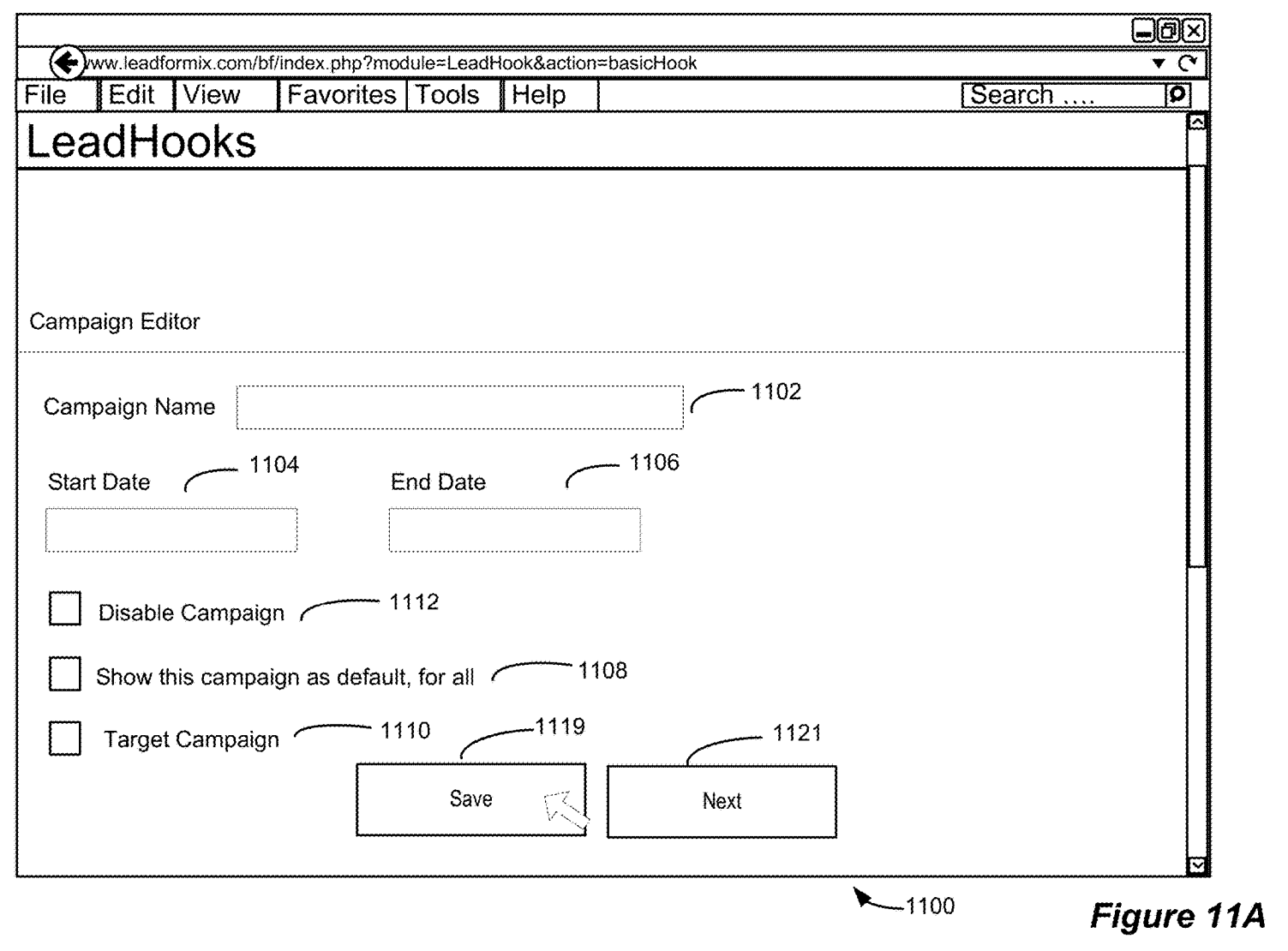

At step 1004, a name of the dynamic content component and a time period to display the dynamic content component in the webpage is received. In some embodiments, a user or a system administrator may access GUI 1100 of FIG. 11A to create a dynamic content component for a marketing campaign. In FIG. 11A, a user may input in textbox 1102 a name of the marketing campaign. It is appreciated that the textbox 1102 is exemplary and not intended to limit the scope of embodiments. For example, a dropdown menu may be used instead.

Further, the GUI 1100 includes text boxes for a user to input a start date 1104 and an end date 1106 to display a marketing campaign in a dynamic content component of a webpage. In this way, the marketing campaign may be rendered in a dynamic content component of webpage for a predetermined time period. In some instances, the dynamic content component may continuously display the content of the marketing campaign of a webpage for a determined time period, independent of the change in the content of the webpage. As illustrated with respect to the dynamic content component 102 of FIGS. 1A and 4. In some embodiments, the start date 1104 and the end date 1106 may remain blank and the marketing campaign may be displayed in a webpage for an indefinite period of time. It is appreciated that the dates may be selected from a dropdown menu, a calendar, or other selectable means.

Further, the GUI 1100 includes checkboxes 1108 and 1110 that may be selected to define a group that can view the marketing campaign while accessing a business organization's webpage. For example, if checkbox 1108 is selected, then the marketing campaign will be displayed in a webpage by default, irrespective of attributes of a user accessing the webpage. However, if checkbox 1110 is selected, then a more targeted marketing campaign may be created. For example, the marketing campaign may be rendered to certain types of users accessing the webpage based on the user's attributes, such as an industry sector associated with a user, a user's geographic location, a business organization associated with a user, and other user attributes described herein. It is appreciated that the checkboxes 1108 and 1110 are exemplary and not intended to limit the scope of embodiments. For example, dropdown menus and/or radio buttons may be used instead.

In some embodiments, after the marketing campaign (i.e., a dynamic content component) is created, GUI 1100 of FIG. 11A may be used to modify the marketing campaign. For instance, a user may select checkbox 1112 to disable the marketing campaign if it is determined that the marketing is no longer going to be used. It is appreciated that the checkbox 1112 is exemplary and not intended to limit the scope of embodiments. For example, a dropdown menu, a textbox, or graphical button configured to stop the marketing campaign may be used instead.

Once the system administrator has completed the form in GUI 1100, the system administrator may either select the save button 1119 to store the information provided or select the next button 1121 to view the next GUI to continue to create the dynamic content component. If the save button 1119 is selected, then the information may be stored in a database as a new dynamic content component with the campaign name designated in textbox 1102. Further, upon selection of button 1119, the GUI changes from GUI 1100 to GUI 1101 illustrated in FIG. 11B. If the next button 1121 is selected, then the provided information may not be saved and the GUI displayed on the system administrator's device may be changed to GUI 1101 of FIG. 11B.

Returning to FIG. 10, information related to user attributes is received at step 1006. As noted above, in some embodiments, various user attributes may be defined, such as location of a user accessing a website, web browsing history of the user, revenue of a business organization associated with the user, a size of the business organization associated with the user, user selection of information related to a hyperlink, social networking information associated with the user, and other user attributes described herein.

Figure 11B:
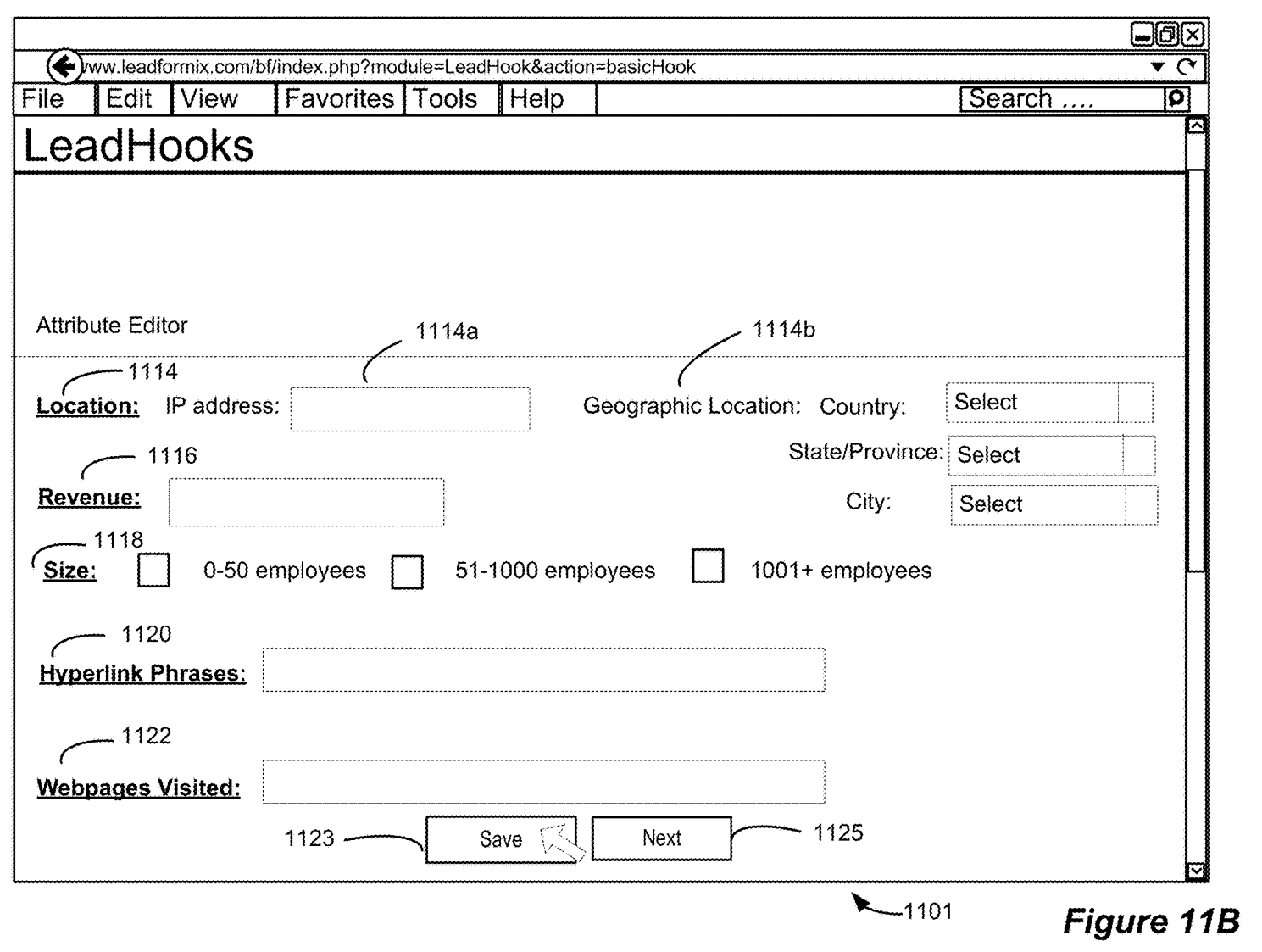

In some embodiments, a user may use the form displayed in GUI 1101 of FIG. 11B to define user attributes. If a user's attributes matches the defined attributes, then the marketing campaign is rendered and displayed in a dynamic content component. For example, in FIG. 11B, a user's location 1114 may be defined, such as an IP address 1114a or a geographic location 1114b. To select a geographic location 1114b, drop down menus may be used to select a country, a state/province or city. Further, GUI 1100 includes a textbox 1116 to define a revenue amount or a revenue range of a business organization associated with a user. GUI 1100 further includes checkboxes 1118 to select a size of the business organization associated with the user. In this example, three options are available for selection. For instance, a system administrator may select among choices of 0-50 employees, 51-1000 employees, or over 1001 employees. In alternative embodiments, the size of a business organization may be designated based on, for instance, a system administrator's input.

In some embodiments, user attributes may include a user's web browsing history. For example, in FIG. 11B, the hyperlink phrases may be defined in textbox 1120. As such, if a user's web browsing history matches the defined hyperlink phrases, then the marketing campaign is displayed in a dynamic content component when the user accesses the webpage. In alternative embodiments, instead of textbox 1120, there may be a dropdown menu including a list of phrases that may be selected. Further, the user attributes may define the webpages 1122 accessed by a user prior to accessing a business organization's website. A system administrator can include a URL address to a webpage, keywords or metadata included in a webpage. As such, if a user has previously visited the webpages defined in 1122, then the marketing campaign is rendered to the user. It is appreciated that the textboxes, dropdown menus, checkboxes of GUI 1101 are exemplary and not intended to limit the scope of embodiments. In some embodiments, other types of GUI components may be used to receive user input instead of the ones illustrated.

All or some of the user attributes in FIG. 11B may be defined by a system administrator, such that the marketing campaign is rendered and displayed in a dynamic content component when a user has attributes that match the defined user attributes.

Once the system administrator has completed the form in GUI 1101, the system administrator may either select the save button 1123 to store the information provided or select the next button 1125 to view the next GUI. The information may be stored in a database as information of a new dynamic content component or may be stored by updating a previously stored dynamic content component. Further, upon selection of button 1123, the GUI may change from GUI 1101 to GUI 1105 illustrated in FIG. 11D. If the next button 1125 is selected, then the GUI may change from GUI 1101 of FIG. 11B to GUI 1105 of FIG. 11D without storing the provided user attribute information.

In some embodiments, a marketing campaign may be defined to be rendered when a user has an intent to purchase a product or service to satisfy a need of his business organization that the user is a part of. For example, in FIG. 11C, a system administrator may select one or multiple checkboxes 1124 to define a user's intent to purchase. In this example, the check box associated with "Ready to Buy" is selected. As such, if it is determined that a user has a "Ready to Buy" intent, then the marketing campaign is rendered in a dynamic content component of a webpage. However, if it is determined that the user has an intent different than "Ready to Buy," then a different content may be rendered and displayed in a dynamic content component of a webpage. As noted above, in some embodiments, a user's intent may be determined as disclosed in disclosed in U.S. patent application Ser. No. 12/618,126, entitled "SYSTEM AND METHODS FOR INFERRING INTENT OF WEBSITE VISITORS AND GENERATING AND PACKAGING VISITOR INFORMATION FOR DISTRIBUTION AS SALES LEADS OR MARKET INTELLIGENCE" by Kumar et al., filed on Nov. 13, 2009, which is incorporated herein in its entirety and for all purposes.

Once the system administrator has completed the form in GUI 1103, the system administrator may either select the save button 1127 to store the information provided or select the next button 1129 to view the next GUI. If button 1127 is selected, then the information may be stored in a database as information of a new dynamic content component or may be stored by updating a previously stored dynamic content component. Further, upon selection of button 1127, the GUI may change from GUI 1103 to GUI 1105 illustrated in FIG. 11D. If the next button 1128 is selected, then the GUI may change from GUI 1103 of FIG. 11C to GUI 1105 of FIG. 11D without storing the user intent information.

Returning to FIG. 10, content to be displayed in response to a user matching the user attributes is determined at step 1008. For example, a text editor 1126 of GUI 1105 illustrated in FIG. 11D may be used to define the content that will be displayed in the marketing campaign. The text editor 1126 includes text boxes to define a title 1128 of the marketing campaign, a heading 1130, and supporting text 1132. It is appreciated that the textboxes (1128, 1130, 1132) are exemplary and not intended to limit the scope of embodiments. For example, dropdown menu or checkboxes or may be used instead. In this example, the title 1128 may include certain text to lure the attention of visitor to a dynamic content component that displays the marketing campaign. For instance, the title may be text included in the tabbed portion 104 of the dynamic content component 102 as shown in FIG. 1A. The heading and supporting text may be content 106 and 120 as illustrated in FIGS. 1B-1E.

If the save button 1131 is selected, then the content provided in text editor 1126 is saved as content of a new dynamic content component or saved by updating data of a previously stored dynamic content component. Then, the GUI may be changed from GUI 1105 to GUI 1109 of FIG. 11F. If the next button 1133 is selected, then the GUI may change from GUI 1105 to GUI 1109 of FIG. 11F without storing the content provided in text editor 1126.

Returning to step 1008, the content used for display may be uploaded from a file stored on the system administrator's device or server. In some embodiments, the content used for display may be determined by executing custom computer program to determine the content to display in a dynamic content component.

In some embodiments, different content may be displayed in a dynamic content component for different users accessing a webpage with different attributes. For example, the type of content displayed may be based on table 700 of FIG. 7. In some embodiments, different content may be displayed in a dynamic content component based on a user's intent to purchase. For example, the type of content displayed may be based on table 800 of FIG. 8.

In some embodiments, different content may be defined using GUI 1107 as shown in FIG. 1E. In this example, different user intents (1134A-1134B) may be selected and corresponding content (1136A-1136B) may be defined to use to display in a dynamic content component. In this way, different market campaigns may be rendered based on a user's intent. If the save button 1135 is selected, then the content provided is saved as content of a new dynamic content component or saved by updating data of a previously stored dynamic content component. Then, the GUI is changed from GUI 1107 to GUI 1109 of FIG. 11F. If the next button 1137 is selected, then the GUI may change from GUI 1107 to GUI 1109 of FIG. 11F instead without saving the content and user intent information.

Figure 11C:
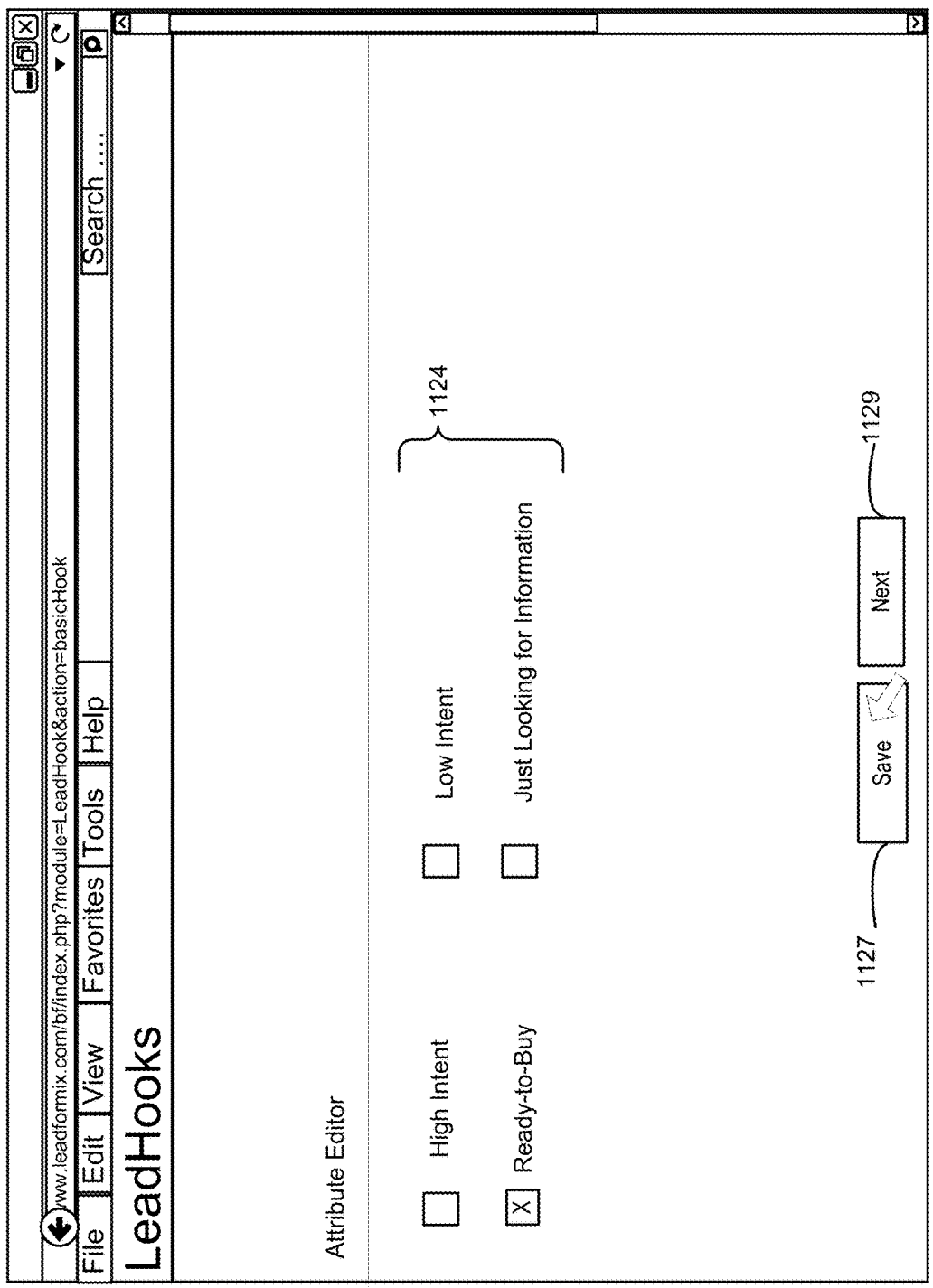
Figure 11D:
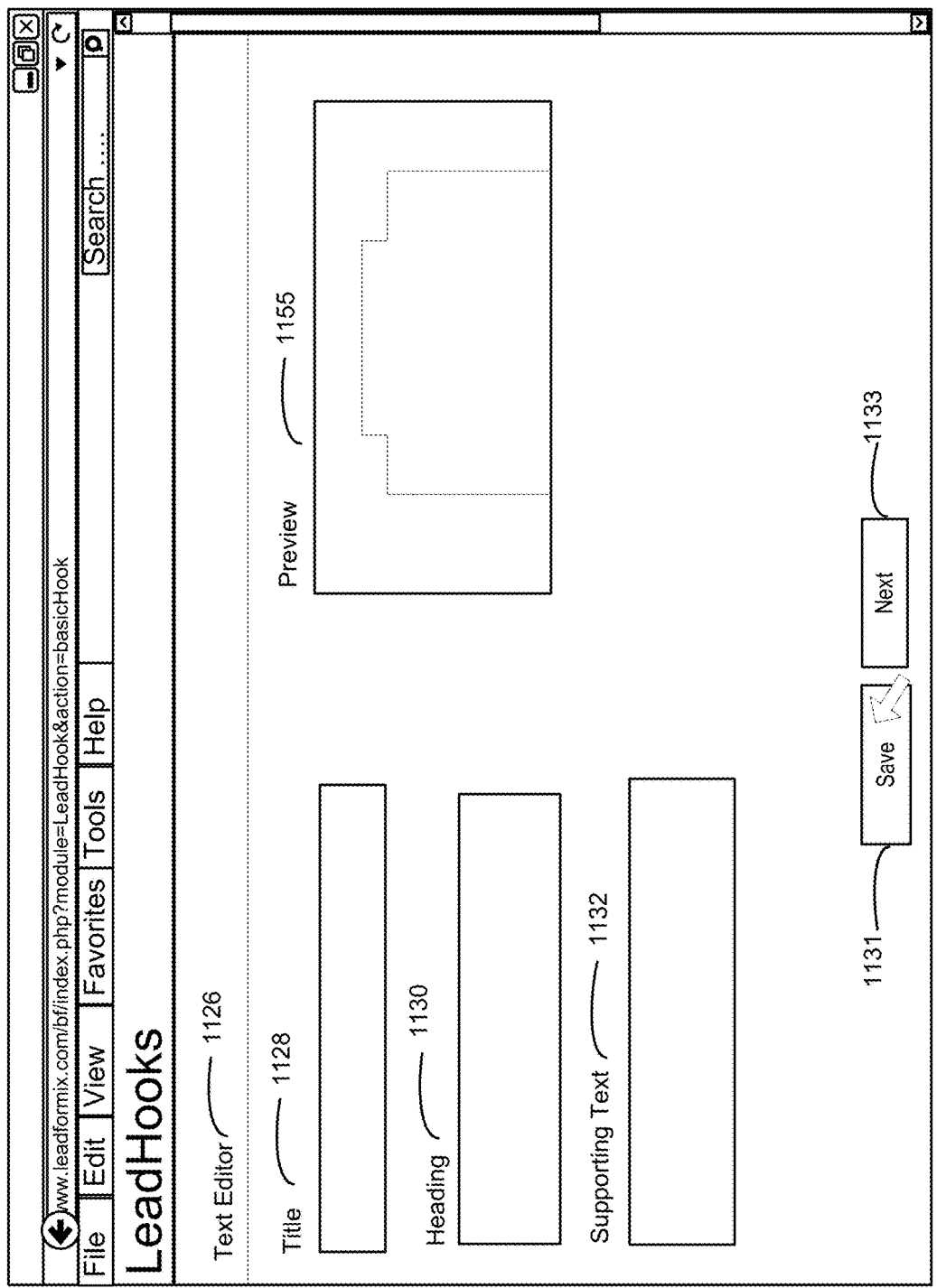
Figure 11E:
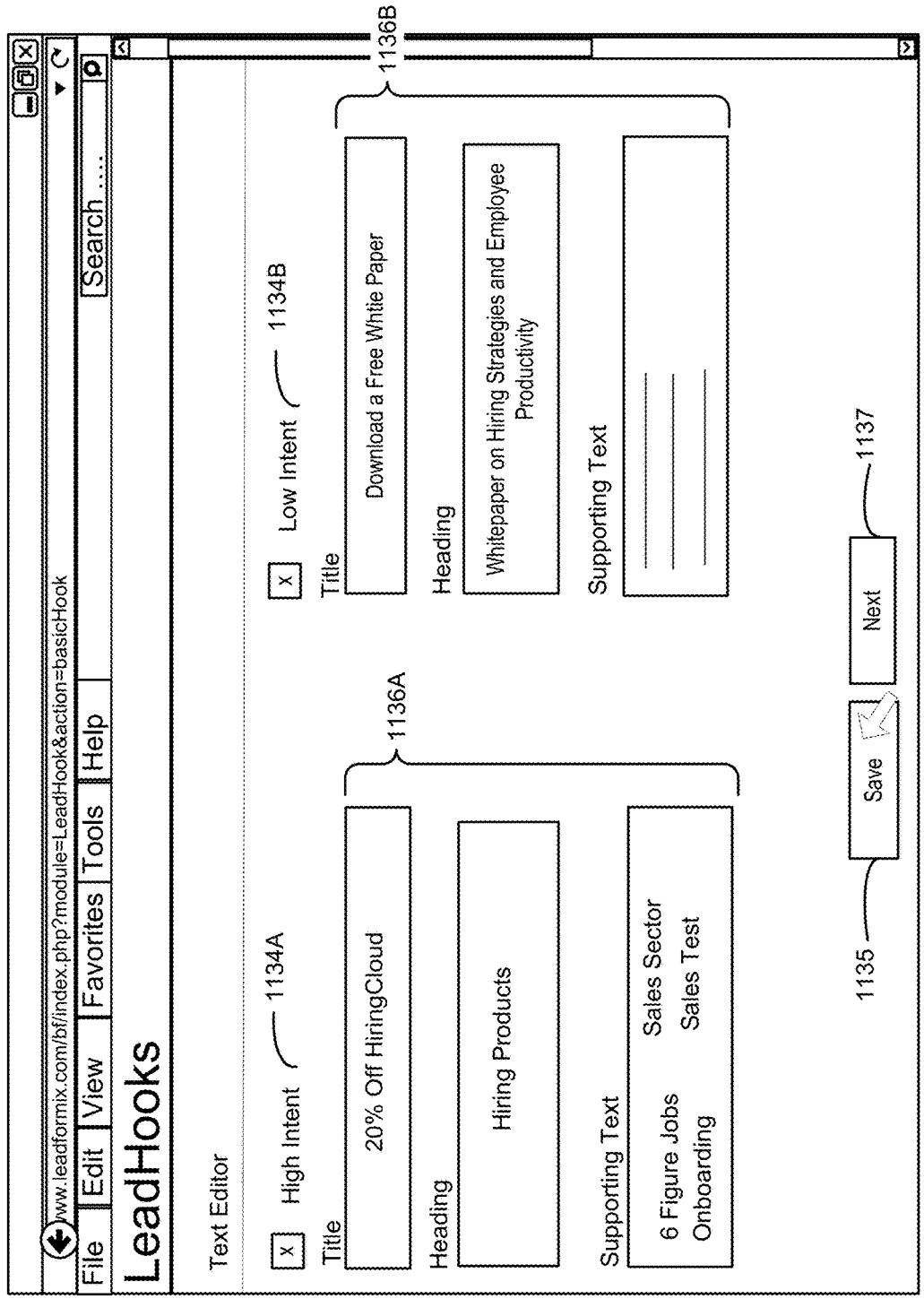
Figure 11F:
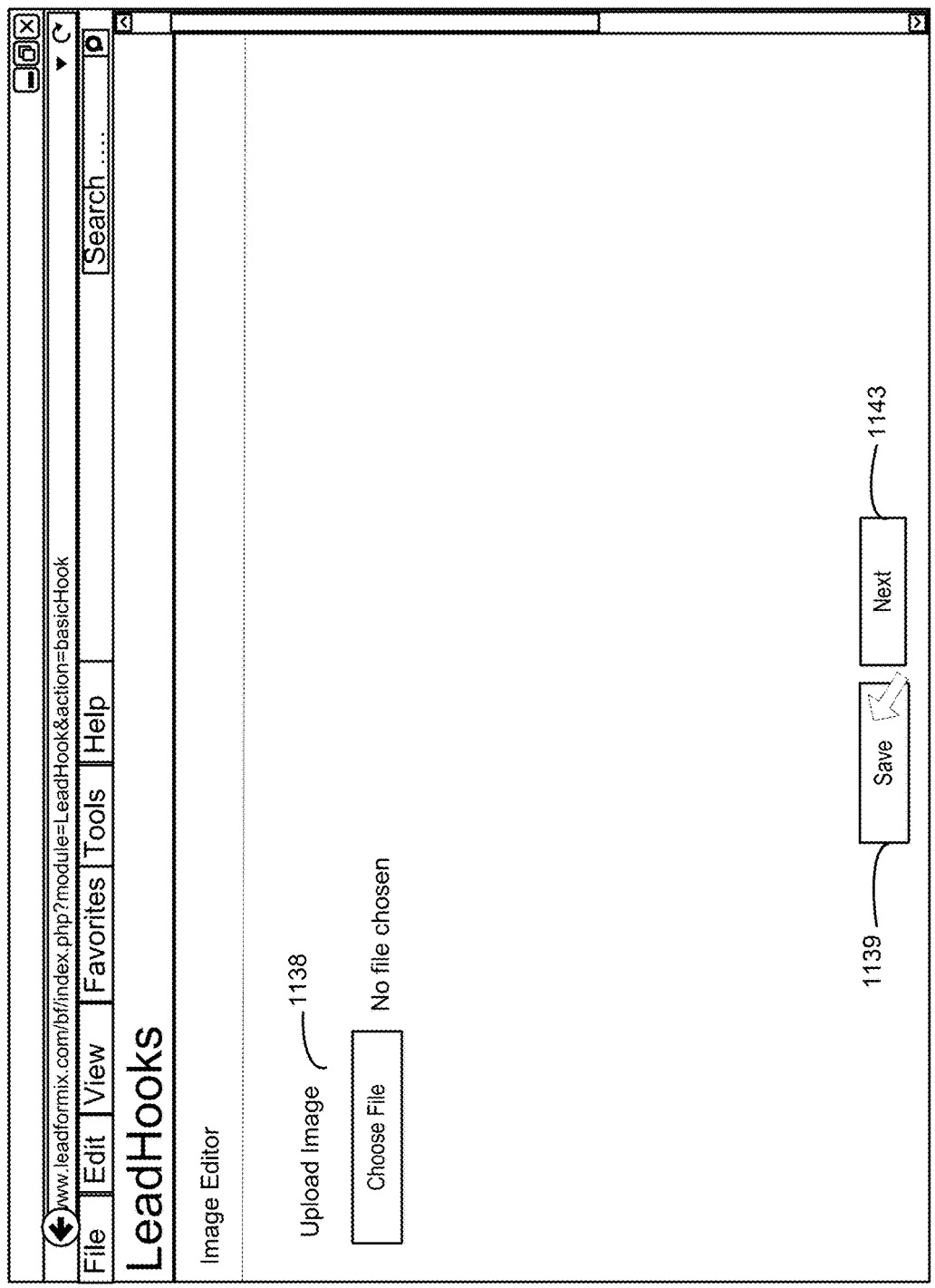

Returning to step 1008 of FIG. 10, the content may include non-text information, such as image, videos, audio files, podcast, a webinar, product offering, service offering, etc. For instance, a system administrator may select an image to be included in a dynamic content component. The system administrator may choose to upload an image 1138 in GUI 1109 as illustrated in FIG. 11F from a memory of a device, a server, or some other storage medium.

If the save button 1139 is selected, then the image provided is saved as content of a new dynamic content component or saved by updating data of a previously stored dynamic content component to include the image. Then, the GUI is changed from GUI 1109 to GUI 1111 of FIG. 11G. If the next button 1143 is selected, the GUI may change from GUI 1109 of FIG. 11F to GUI 1111 of FIG. 11G without saving the provided image.

Returning to FIG. 10, instructions to perform an operation are received at step 1010. In some embodiments, the instructions may be to receive and determine user information. For example, the dynamic content component may be configured to include a form to receive user information. In FIG. 11G, one or multiple fields 1140 may be selected to include in form 1141, such as name, email address, company the visitor works for, phone number to generate a form similar to forms 108 and 206 of FIGS. 1B and 2D, respectively. It is appreciated that the fields 1140 are exemplary and not intended to limit the scope of embodiments. In some embodiments, a system administrator may input a custom field. In some embodiments, the fields may be related to information about a business organization that a user belongs to.

In some embodiments, the form 1141 may be configured to auto populate fields by downloading user information from an online social networking sites by selecting check boxes 1142 and 1144. It is appreciated that the information may be automatically populated through other means and not limited to social networking sites. For example, cookies may be used to automatically populate the form.

The instructions may include operations to perform when a form is completed. For instance, the instructions may trigger the information that is received from user to be stored as information of a potential customer in database.

In some embodiments, the instructions may include operations to display content on a display device. For instance, the instructions may further include operations to respond to a selection of: a link to a webpage, an icon to download or upload data, an icon to render non-text information, an icon to initiate a financial transaction, etc. For example, in FIG. 11G, a system administrator may select among checkboxes 1146 of the different types of action buttons to include in a dynamic content component. For instance, if a dynamic content component is being used to promote a product, then selection of a buy now button may be configured to initiate a purchase of the product. If a download now button is selected, the download now button may be configured to allow a user to download the product. If a free trial button is selected, then the free trial button may be configured to allow a user to test out a product. If the system administrator selects a read more button, then the read more button may be configured to display more information about a product to a visitor of the webpage. It is appreciated that the action buttons 1146 are exemplary and not intended to limit the scope of embodiments. In some embodiments, a system administrator may upload a program or script to create a custom action button.

If the save button 1145 is selected, then the instructions provided are saved as operations to perform in association with a new dynamic content component or a previously stored dynamic content component. Then, the GUI may be changed from GUI 1111 to GUI 1113 of FIG. 11H. If the next button 1147 is selected, then the GUI may change from GUI 1111 of FIG. 11G to GUI 1113 of FIG. 11H without saving the provided instructions.

Returning to FIG. 10, graphical design instructions for generating a graphical representation of the dynamic content component are received at step 1012. In some embodiments, the graphical design instructions may include instructions on the shape of the dynamic content component, the color and position of the component in a webpage. For example, a design editor 1148 of FIG. 11H may be used to design a dynamic content component. The user may select, for instance, a shape 1150 for the dynamic content component. In this example, a user may select one of the few different designs of a tabbed folder as the shape of the dynamic content component. In some other embodiments, the dynamic content component may be designed in a different shape such as circular shape, a cloud like shape, or designed as a rectangle. In some embodiments, the system administrator may design and upload a custom shape of the dynamic content component.

Figure 11H:
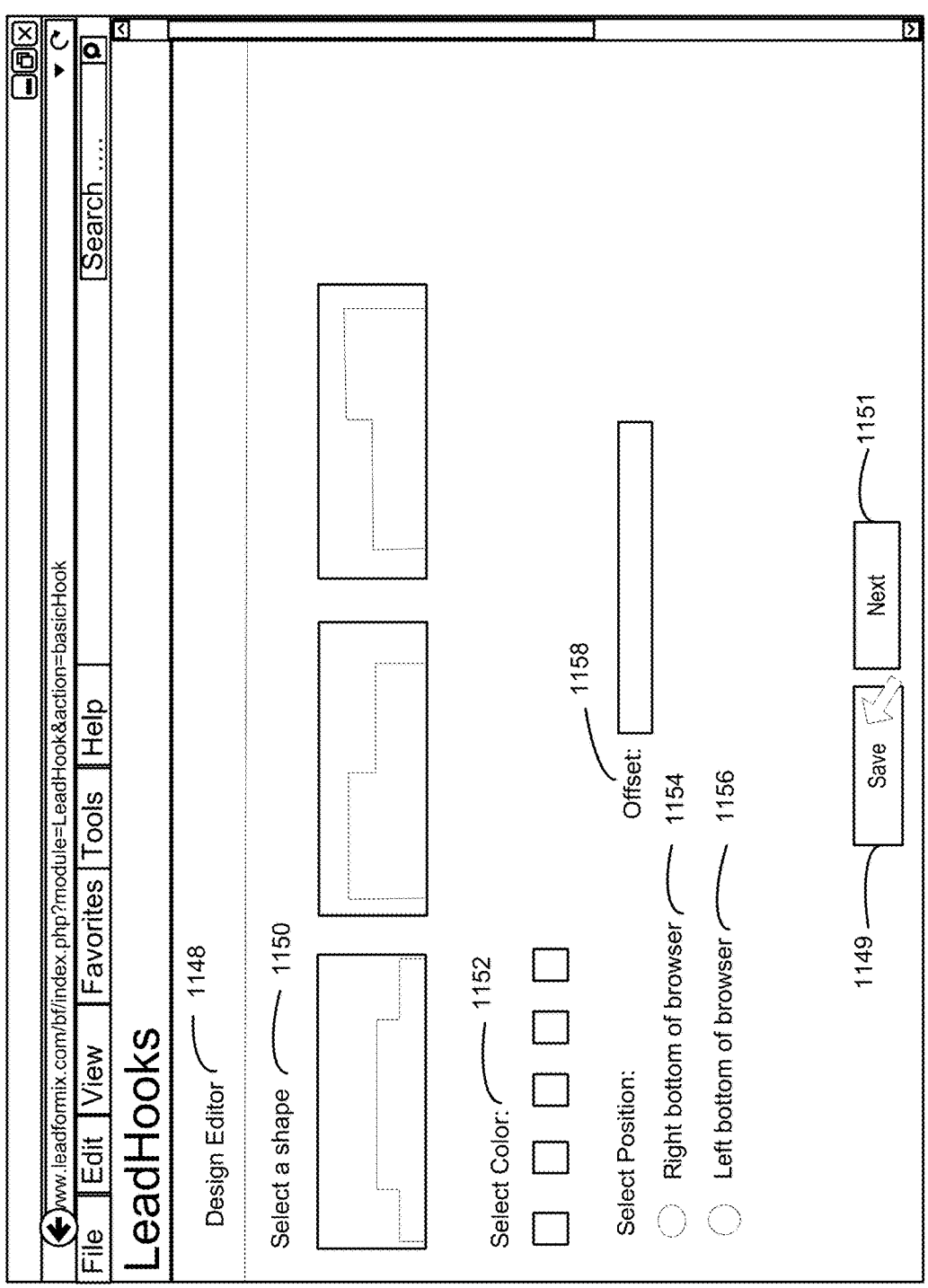

Further, a system administrator may select a color 1152 from a myriad of different color to fill the background of the dynamic content component. The system administrator may also select a position of the dynamic content component in a webpage. For example, in FIG. 11H, the system administrator may select between a "right bottom of browser" position 1154 or a "left bottom of browser" position 1156 of the dynamic content component in the webpage. Further, an offset position 1158 of the dynamic content component position may be defined. Although FIG. 11H illustrates two options to position a dynamic content component in a webpage, other positions are possible as illustrated in FIGS. 2A-2D and FIGS. 3A-3B.

If the save button 1149 is selected, then the graphical design instructions are saved to use to render a graphical representation of a dynamic content component. In some embodiments, the graphical design instructions are saved associated with a new dynamic content component or saved by updating data of a previously stored dynamic content component. Then, the GUI is changed from GUI 1113 to GUI 1115 of FIG. 11I. If the next button 1151 is selected, then the GUI may change from GUI 1113 to GUI 1115 of FIG. 11I without saving the graphical design instructions.

Figure 11I:
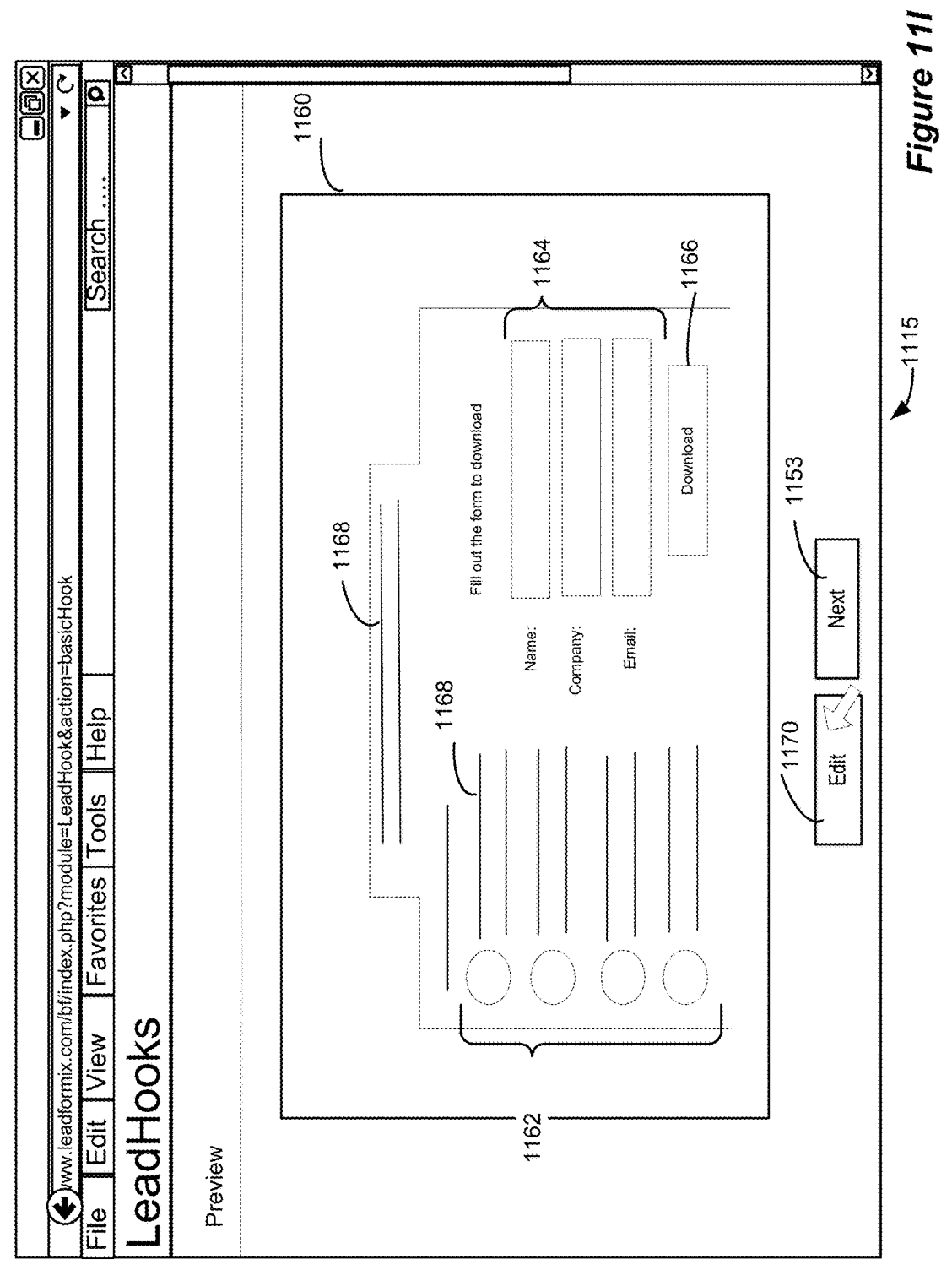

Returning to FIG. 10, a preview of the dynamic content component is generated at step 1014. Once a user has created the name, selected user attributes, determined the content used for display and a design of the dynamic content component, then a mock up 1160 of the dynamic content component may be displayed as shown in FIG. 11I. The preview allows a system administrator to view and edit the dynamic content component before it is published and used as part of a webpage. The mock up 1160 includes the image 1162, the form 1164, the button 1166 and content 1168. If the system administrator is not satisfied with the dynamic content component, then the system administrator may select button 1170 to continue to make changes to the dynamic content component. Otherwise, the system administrator my select the next button 1153, to view the next GUI in the process of creating a dynamic content component, such as GUI 1117 of FIG. 11J.

In some alternative embodiments, the preview may be generated concurrently as a system administrator is creating the dynamic content component in steps 1002-1012 of FIG. 10. For instance, a preview may be generated while content is determined for a dynamic content component in step 1008. For example, with reference to FIG. 11D, a preview 1155 of the dynamic content component may be generated. As a system administrator types in the title 1128, heading 1130 and supporting text 1132, he can simultaneously view the placement of the title, heading supporting text in the preview 1155. Based on the appearance of the dynamic content component in the preview 1155, he can edit the content to include concise sentences, use different fonts, determine whether to use bold or italics, and modify the content as the system administrator desires.

Returning to FIG. 10, code to display the dynamic content component in the webpage is generated at step 1016. In some embodiments, one or more servers are configured to execute an application to generate two lines of HTML code 1172 as illustrated in FIG. 11J. Then, these two lines of code 1172 may be copied by selecting button 1174 and inserted in between an HTML </body> tag of a HTML webpage template or within a source code of a webpage. In some embodiments, the code 1172 is incorporated into a webpage's source code in such a manner that a dynamic content component is rendered in one or multiple webpages of a website.

In some embodiments, the code 1172 is configured as a function call to a server to request for webpage data to display a dynamic content component. Further, the request may cause the server to perform operations and methods, similar to methods 500 and 900, to determine and provide the relevant content to display in a dynamic content component. In this way, the content displayed in a dynamic content component may be dynamically changed at the server end without requiring an update of the code 1172 that is incorporated into the webpage template/source. It is appreciated that the code 1172 does not need to be updated because, as noted, the code 1172 initiates a function call to a server to request for webpage data and is independent of the content stored in a server.

In some alternative embodiments, the dynamic content component may not be a part of a webpage, but instead part of a web browser. For example, method 1000 may be used to create a plug-in for a browser, such that the dynamic content component is displayed independently of a webpage.

Figure 12:
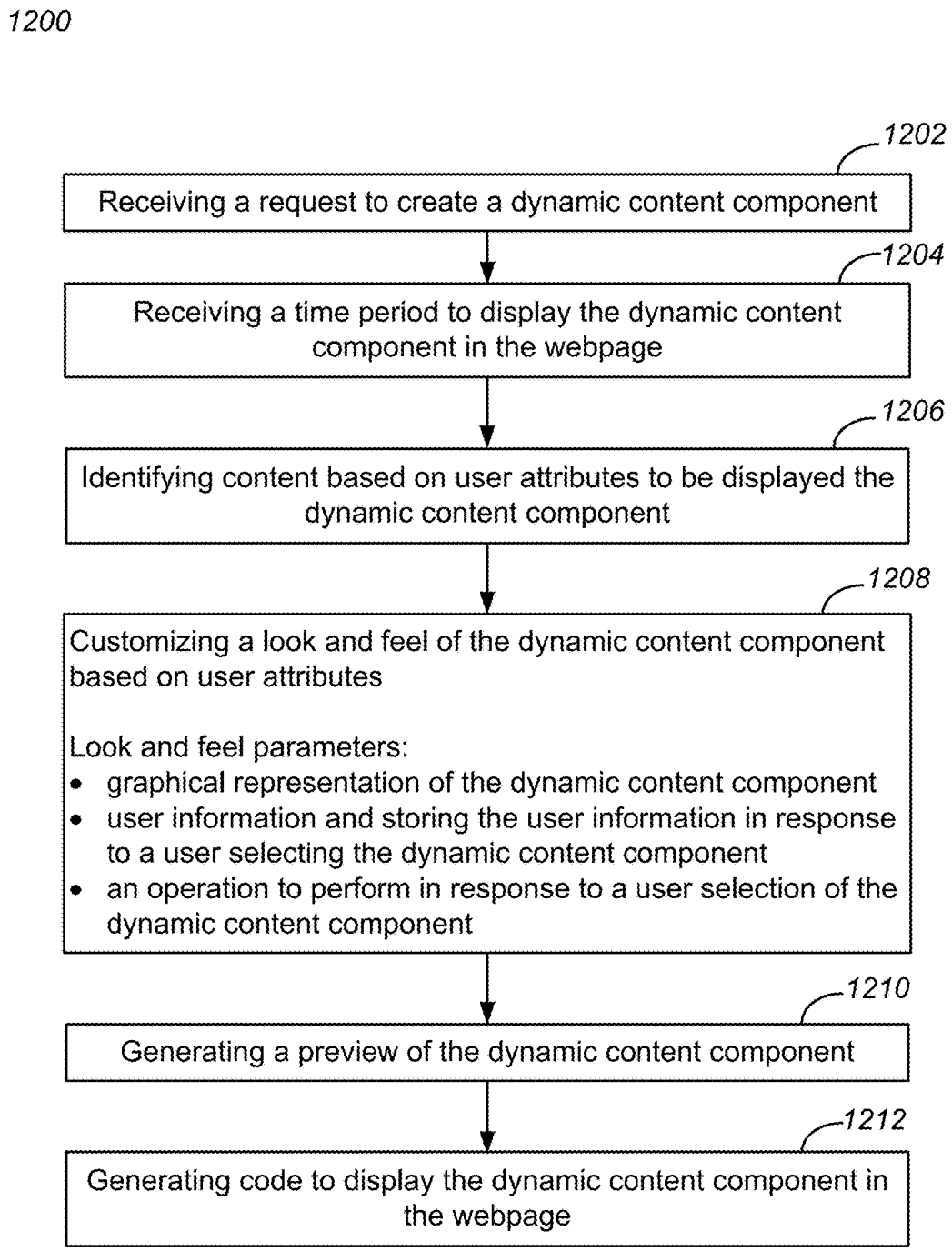
FIG. 12 shows one exemplary method to create a custom look and feel of a dynamic content component according to one embodiment.

Referring now to FIG. 12, FIG. 12 shows one exemplary method to create a custom look and feel of a dynamic content component according to one embodiment. In some embodiments, servers or computing devices may be configured to perform all or parts of method 1200. In some embodiments, steps 1202-1212 are not necessarily performed in the order shown in FIG. 12. Instead, these steps 1202-1216 may be performed in any order to create a dynamic content component. For example, steps 1206 and 1208 may be performed before step 1204. Further, in some embodiments not all steps shown in FIG. 12 are performed. For example, step 1210 may be optionally performed.

In some embodiments, steps 1202 and 1204 are performed in a substantially similar manner as steps 1002 and 1004 of FIG. 10. At step 1206, content based on user attributes to display in the dynamic content component are identified. In some embodiments, the user attributes may be the different attributes described herein. In some embodiments, step 1206 may be implemented in a substantially similar manner as step 1008 of FIG. 10 and as described with respect to FIGS. 11D and 11E.

At step 1208, a look and feel of the dynamic content component based on user attributes are customized. In some embodiments, the look and feel of the dynamic content component may be configured based on user input. For example, a user may use a GUI similar to GUIs of FIGS. 11A-11J to customize the look and feel of the dynamic content component. In another example, a user may upload a customized computer program defining different look and feel parameters of a dynamic content component.

In some embodiments, the look and feel of the dynamic content component may be based on user attributes, such as the attributes described herein. In some embodiments, a look and feel parameters may define a graphical representation of the dynamic component to include in the webpage. For example, the parameters may define a color, a shape, an image and a position of the dynamic content component in the webpage. In some embodiments, look and feel parameters may be defined and performed in a substantially similar manner as step 1012 of FIG. 10.

In some embodiments, the look and feel parameters may be used to define user information to receive from a user accessing the webpage, and to store the user information as information of a potential customer. For example, the look and feel parameters may define whether the dynamic content component should include a user fillable form and the types of user information to receive from the user (e.g., name, title, company, and other user attributes described herein). In some embodiments, the user information may be defined by selecting the form checkbox 1141 and selecting user information 1140 as illustrated in FIG. 11G.

In some embodiments, the look and feel parameters may define an operation to perform in response to a user selection of the dynamic content component. In some embodiments, the operation may be an operation to download data, initiate a financial transaction, and display additional information related to the identified content in step 1206. In some embodiments, the operation may be defined by selecting one or more action buttons 1146 illustrated in FIG. 11G.

In some embodiments, steps 1210 and 1212 are performed in a substantially similar manner as steps 1014 and 1016 of FIG. 10.

Figure 13:
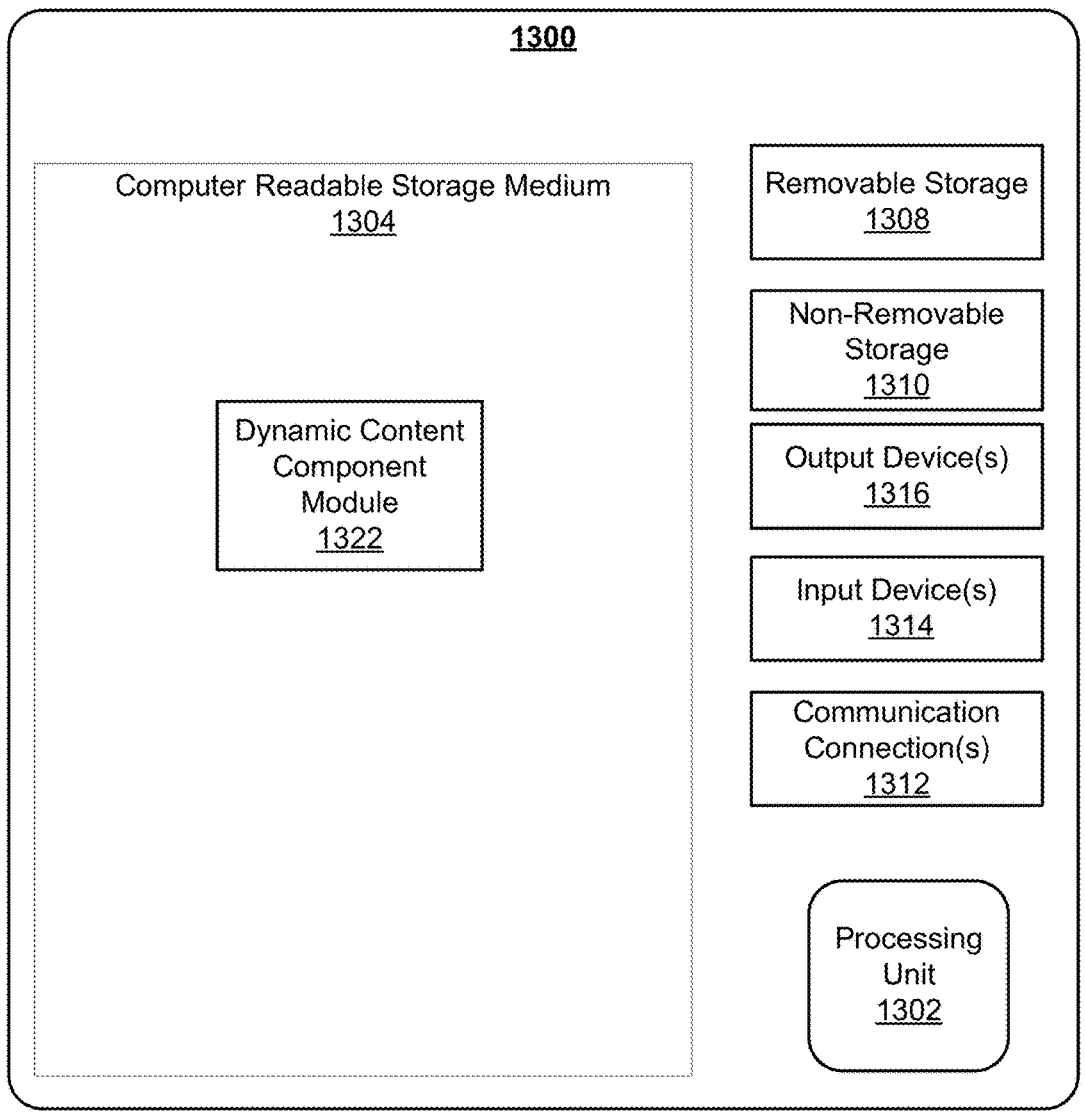
FIG. 13 shows an exemplary computer system in accordance with one embodiment.

Referring now to FIG. 13, FIG. 13 shows an exemplary computer system in accordance with one embodiment. With reference to FIG. 13, an exemplary system module for implementing embodiments includes a general purpose computing system environment, such as computing system environment 1300. Computing system environment 1300 may include, but is not limited to, servers, switches, routers, desktop computers, laptops, tablets, mobile devices, and smartphones. In its most basic configuration, computing system environment 1300 typically includes at least one processing unit 1302 and computer readable storage medium 1304. Depending on the exact configuration and type of computing system environment, computer readable storage medium 1304 may be volatile (such as RAM), non-volatile (such as ROM, flash memory, etc.) or some combination of the two.

Additionally, in various embodiments, computing system environment 1300 may also have other features/functionality. For example, computing system environment 1300 may also include additional storage (removable and/or non-removable) including, but not limited to, magnetic or optical disks or tape. Such additional storage is illustrated by removable storage 1308 and non-removable storage 1310. Computer storage media includes volatile and nonvolatile, removable and non-removable media implemented in any method or technology for storage of information such as computer readable instructions, data structures, program modules or other data. Computer readable medium 1304, removable storage 1308 and nonremovable storage 1310 are all examples of computer storage media. Computer storage media includes, but is not limited to, RAM, ROM, EEPROM, flash memory or other memory technology, expandable memory (e.g., USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 1300. Any such computer storage media may be part of computing system environment 1300.

In some embodiments, computing system environment 1300 may also contain communications connection(s) 1312 that allow it to communicate with other devices. Communications connection(s) 1312 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 1312 may allow computing system environment 1300 to communicate over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 1312 connect to may run a plurality of network protocols including, but not limited to, transmission control protocol (TCP), user datagram protocol (UDP), internet protocol (IP), real-time transport protocol (RTP), real-time transport control protocol (RTCP), file transfer protocol (FTP), and hypertext transfer protocol (HTTP).

In further embodiments, computing system environment 1300 may also have input device(s) 1314 such as keyboard, mouse, a terminal or terminal emulator (either connected or remotely accessible via telnet, SSH, http, SSL, etc.), pen, voice input device, touch input device, remote control, etc. Output device(s) 1316 such as a display, a terminal or terminal emulator (either connected or remotely accessible via telnet, SSH, http, SSL, etc.), speakers, light emitting diodes (LEDs), etc. may also be included. All these devices are well known in the art and are not discussed at length.

In one embodiment, computer readable storage medium 1304 includes a dynamic content component module 1322 operable to create and display a dynamic content component in a webpage according to methods 500, 900 and 1000, for instance.

It is appreciated that implementations according to embodiments of the present invention that are described with respect to a computer system are merely exemplary and not intended to limit the scope of the present invention. For example, embodiments of the present invention may be implemented on devices such as switches and routers, which may contain application specific integrated circuits (ASICs), field programmable gate arrays (FPGAs), etc. It is appreciated that these devices may include a computer readable medium for storing instructions for implementing methods 500, 900 and 1000, for instance.

Figure 14:
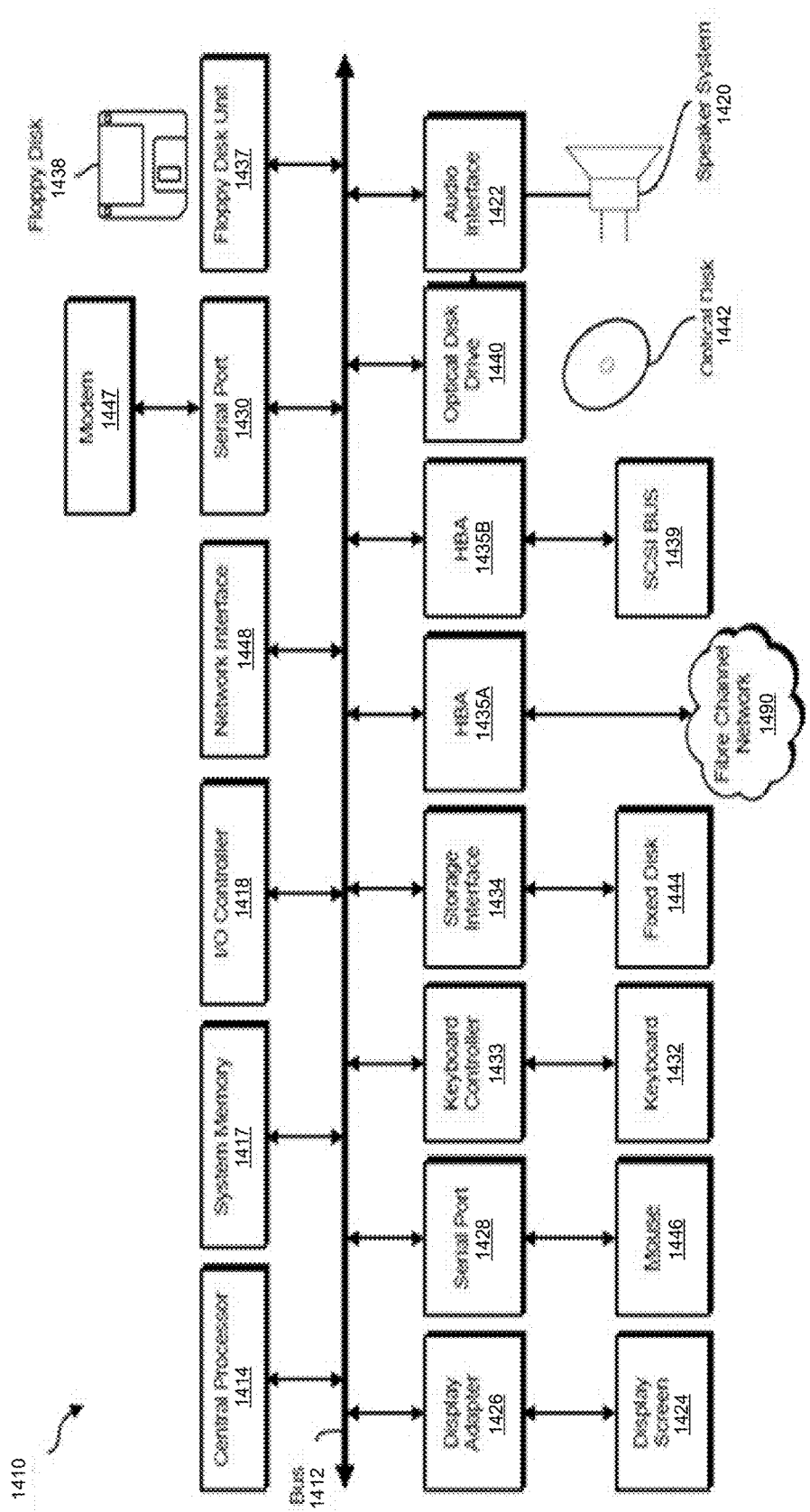
FIG. 14 shows a block diagram of another exemplary computer system in accordance with one embodiment.

Referring now to FIG. 14, FIG. 14 shows a block diagram of another exemplary computer system in accordance with one embodiment. FIG. 14 depicts a block diagram of a computer system 1410 suitable for implementing the present disclosure. For example, the computer system 1410 may be configured to execute the methods described herein, such as methods 500, 900 and 1000. Further, the computer system 1410 may be configured to render the dynamic content component as described herein. Computer system 1410 includes a bus 1412 which interconnects major subsystems of computer system 1410, such as a central processor 1414, a system memory 1417 (typically RAM, but which may also include ROM, flash RAM, or the like), an input/output controller 1418, an external audio device, such as a speaker system 1420 via an audio output interface 1422, an external device, such as a display screen 1424 via display adapter 1426, serial ports 1428 and 1430, a keyboard 1432 (interfaced with a keyboard controller 1433), a storage interface 1434, a floppy disk drive 1437 operative to receive a floppy disk 1438, a host bus adapter (HBA) interface card 1435A operative to connect with a Fibre Channel network 1490, a host bus adapter (HBA) interface card 1435B operative to connect to a SCSI bus 1439, and an optical disk drive 1440 operative to receive an optical disk 1442. Also included are a mouse 1446 (or other point-and-click device, coupled to bus 1412 via serial port 1428), a modem 1447 (coupled to bus 1412 via serial port 1430), and a network interface 1448 (coupled directly to bus 1412). It is appreciated that the network interface 1448 may include one or more Ethernet ports, wireless local area network (WLAN) interfaces, etc., but are not limited thereto.

Bus 1412 allows data communication between central processor 1414 and system memory 1417, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1410 are generally stored on and accessed via a computer readable medium, such as a hard disk drive (e.g., fixed disk 1444), an optical drive (e.g., optical drive 1440), a floppy disk unit 1437, or other storage medium. Additionally, applications can be in the form of electronic signals modulated in accordance with the application and data communication technology when accessed via network modem 1447 or interface 1448.

Storage interface 1434, as with the other storage interfaces of computer system 1010, can connect to a standard computer readable medium for storage and/or retrieval of information, such as a fixed disk drive 1444. Fixed disk drive 1444 may be a part of computer system 1410 or may be separate and accessed through other interface systems. Network interface 1448 may provide multiple connections to other devices. Furthermore, modem 1447 may provide a direct connection to a remote server via a telephone link or to the Internet via an internet service provider (ISP). Network interface 1448 may provide one or more connection to a data network, which may include any number of networked devices. It is appreciated that the connections via the network interface 1448 may be via a direct connection to a remote server via a direct network link to the Internet via a POP (point of presence). Network interface 1448 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 14 need not be present to practice the present disclosure. The devices and subsystems can be interconnected in different ways from that shown in FIG. 14. The operation of a computer system such as that shown in FIG. 14 is readily known in the art and is not discussed in detail in this application. Code to implement the present disclosure can be stored in computer-readable storage media such as one or more of system memory 1417, fixed disk 1444, optical disk 1442, or floppy disk 1438. The operating system provided on computer system 1410 may be MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed:

1. A method comprising:
   receiving a request to create a dynamic content component;
   identifying content to be displayed in the dynamic content component, wherein the content is based on first user attributes associated with a user, wherein the content is the same between the user and another user if the another user has the same first user attributes as the user and wherein the content is different for the another user if the another user has first user attributes that are different from that of the user, wherein the first user attributes comprise a geographical location of a business organization that the request is originated from, a geographical location of the user, a revenue associated with the business organization, and wherein the business organization and the revenue associated with the business organization is third party provided, and wherein the first user attributes further comprise user selection of information related to a hyperlink, user highlighting of webpage text, search terms, and mouse movement;
   customizing a look and feel of the dynamic content component based on a second user attributes associated with the user, wherein the look and feel is the same between the user and the another user if the another user has the same second user attributes as the user and wherein the look and feel is different for the another user if the another user has second user attributes that are different from that of the user, and wherein the second user attributes are device independent; and
   generating a code to display the dynamic content component in response to the user accessing a webpage, wherein the identified content is rendered in the customized look and feel of the dynamic content component.

2. The method of claim 1 further comprising:
   receiving a time period to display the dynamic content component in the webpage.

3. The method of claim 1 further comprising:
   performing an operation in response to a user selection of the dynamic content component, wherein the operation is selected from the group consisting of downloading data, initiating a financial transaction, and displaying additional information related to the identified content.

4. The method of claim 1 further comprising:
   generating a graphical representation of the dynamic content component to include in the webpage, wherein the graphical representation includes a color, a shape, an image and a position of the dynamic content component in the webpage.

5. The method of claim 1 further comprising:
   prior to generating the code, generating a preview of the dynamic content component.

6. The method of claim 1 further comprising:
determining user information based on the user accessing the webpage; and
storing the user information as a potential customer in response to the user selecting the dynamic content component.

7. The method of claim 1,
wherein the code is configured to render the dynamic content component in a first sized window to display a portion of the identified content; and
wherein the code is further configured to change the window size of the dynamic content component from the first size to a second size to display more detail related to the identified content in comparison to the portion of the identified content, wherein the change in size is in response to a user selection of the dynamic content component.

8. The method of claim 7,
wherein the code is further configured to position the dynamic content component near an edge of the webpage; and
wherein the code is further configured to display a portion of the dynamic content component and maintain the window near the edge of the webpage when the window of the dynamic content component changes size from the first size to the second size.

9. A method comprising:
receiving a selection of content;
receiving a selection of look and feel parameters to customize a dynamic content component;
receiving first and second user attributes, wherein the first user attributes include user selection of information related to a hyperlink, user highlighting of webpage text, search terms and mouse movement; and
generating a code based on the selection of content, the selection of look and feel parameters, and further based on the first and the second user attributes, wherein the content is the same for a user and for another user if the another has the same first user attributes as the user and wherein the content is different for the another user if the another user has first user attributes that are different from that of the user, and wherein the first user attributes include a geographical location of the user and further includes a geographical location of a business organization associated with the user, and wherein the look and feel is the same for the user and for the another user if the another user has the same second user attributes as the user and wherein the look and feel is different for the another user if the another user has second user attributes that are different from that of the user, wherein the code is operable to customize and display the selected content in the customized dynamic content component, wherein the display of the selection of content in the customized dynamic content component is in response to a user selection of the content rendered on the webpage and further in response to attributes the user accessing the webpage matching the received user attributes, wherein the second user attributes are device independent.

10. The method of claim 9 further comprising receiving a selection of a time period to display the dynamic content component in the webpage.

11. The method of claim 9, wherein the look and feel includes a color, a shape, an image and a position of the dynamic content component in the webpage.

12. The method of claim 9, wherein the dynamic content component includes a user fillable form in response to a selection thereof.

13. The method of claim 9, wherein the dynamic content component includes a graphical user interface button for performing an operation in response to a selection thereof.

14. The method of claim 13, wherein the GUI button is selected from the group consisting of: a GUI button configured to cause a download of data, a GUI button configured to initiate a financial transaction, and a GUI button configured to display additional information related to the selection of content.

15. The method of claim 9 further comprising displaying a preview of the selection of content in the customized dynamic content component.

16. A non-transitory computer-readable storage medium storing instructions executable by a processor to perform a method to create a dynamic content component, the method comprising:
receiving a request to create a dynamic content component, wherein the request includes a token that communicates with at least one social networking provider to obtain at least one attribute of first user attributes that is associated with a user responsive to validation of the token;
identifying content to be displayed in the dynamic content component, wherein the content is based on the first user attributes associated with the user, wherein the content is the same between the user and another user if the another user has the same first user attributes as the user and wherein the content is different for the another user if the another user has first user attributes that are different from that of the user, and wherein the content is further based on a geographical location of a business organization that the request is originated from, a geographical location of the user, a size associated with the business organization, competitors of the business organization, suppliers of the business organization, customers of the business organization, and a department within the business organization that the request is originated from, and wherein the business organization is third party provided, and wherein the content is further based on a product or service associated with the business organization, and wherein the first user attributes further comprise user interaction with a content of a webpage and a web browsing history of the user;
customizing a look and feel of the dynamic content component based on a second user attributes associated with the user, wherein the look and feel is the same between the user and the another user if the another user has the same second user attributes as the user and wherein the look and feel is different for the another user if the another user has second user attributes that are different from that of the user, and wherein the second user attributes are device independent; and
generating a code to display the dynamic content component in response to the user accessing a webpage, wherein the identified content is rendered in the customized look and feel of the dynamic content component.

17. The non-transitory computer-readable storage medium of claim 16, the method further comprising:
receiving a time period to display the dynamic content component in the webpage.

18. The non-transitory computer-readable storage medium of claim 16, the method further comprising:

performing an operation in response to a user selection of the dynamic content component, wherein the operation is selected from the group consisting of downloading data, initiating a financial transaction, and displaying additional information related to the identified content.

19. The non-transitory computer-readable storage medium of claim 16, the method further comprising:

generating a graphical representation of the dynamic content component to include in the webpage, wherein the graphical representation includes a color, a shape, an image and a position of the dynamic content component in the webpage.

20. The non-transitory computer-readable storage medium of claim 16, the method further comprising:

prior to generating the code, generating a preview of the dynamic content component.

21. The method of claim 1, wherein the content is selected from a group consisting of a person or a group within the business organization, or event associated with the business organization, or news article related to the business organization.

22. The method of claim 1, wherein the content is related to a product or service based on a determined level of interest to the user.

* * * * *